US008170467B2

(12) United States Patent
Stoddard

(10) Patent No.: US 8,170,467 B2
(45) **Date of Patent: *May 1, 2012**

(54) MULTI-BAND JAMMER INCLUDING AIRBORNE SYSTEMS

(75) Inventor: Robert Eugene Stoddard, Sunnyvale, CA (US)

(73) Assignee: Aeroflex High Speed Test Solutions, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/728,379

(22) Filed: Mar. 22, 2010

(65) Prior Publication Data

US 2011/0223851 A1 Sep. 15, 2011

Related U.S. Application Data

(63) Continuation-in-part of application No. 11/522,300, filed on Sep. 15, 2006, now Pat. No. 7,697,885.

(51) Int. Cl.
*H04K 3/00* (2006.01)
*H04B 1/10* (2006.01)
*H04B 1/38* (2006.01)

(52) U.S. Cl. .......... 455/1; 455/296; 455/115.1; 455/318

(58) Field of Classification Search .................. 455/427, 455/429, 1, 132, 115.1; 375/132
See application file for complete search history.

(56) References Cited

U.S. PATENT DOCUMENTS

| | | | | |
|---|---|---|---|---|
| 5,787,333 | A * | 7/1998 | Rasinski et al. | 434/4 |
| 6,954,482 | B2 * | 10/2005 | Mills et al. | 375/132 |
| 6,999,498 | B2 * | 2/2006 | Mills et al. | 375/133 |
| 7,532,856 | B2 * | 5/2009 | Stoddard et al. | 455/1 |
| 7,697,885 | B2 * | 4/2010 | Stoddard | 455/1 |
| 8,027,655 | B2 * | 9/2011 | Lee et al. | 455/296 |
| 8,059,619 | B2 * | 11/2011 | Jakobsen et al. | 370/337 |

* cited by examiner

*Primary Examiner* — Tilahun B Gesesse
(74) *Attorney, Agent, or Firm* — David E. Lovejoy

(57) ABSTRACT

An airborne jammer for transport by an aircraft for jamming communications in a communications system where the communications system operates with digital bursts having burst periods measured in time and occurring in a communication frequency band such as GSM having a transmit band and a receive band. The jammer includes a tone comb generator for providing repetitions of jamming signals for the communication frequency band where the jamming signals have jamming signal intervals providing frequency separation between the jamming signals. The jamming signals are generated with a dwell time substantially less than a burst period for the communications system. The jamming signals are transmitted as RF jamming signals to jam communications for mobile stations.

19 Claims, 11 Drawing Sheets

FIG. 12
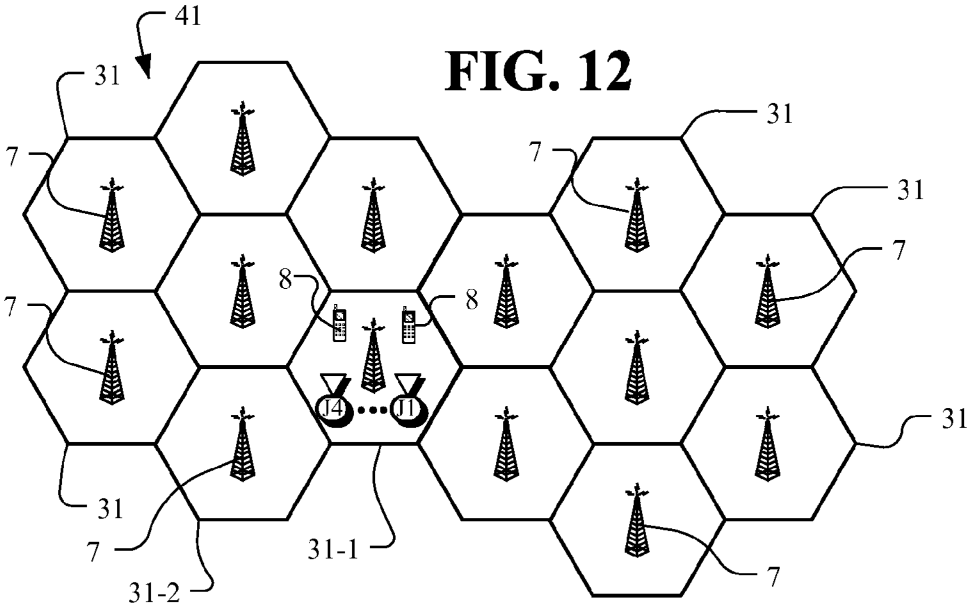
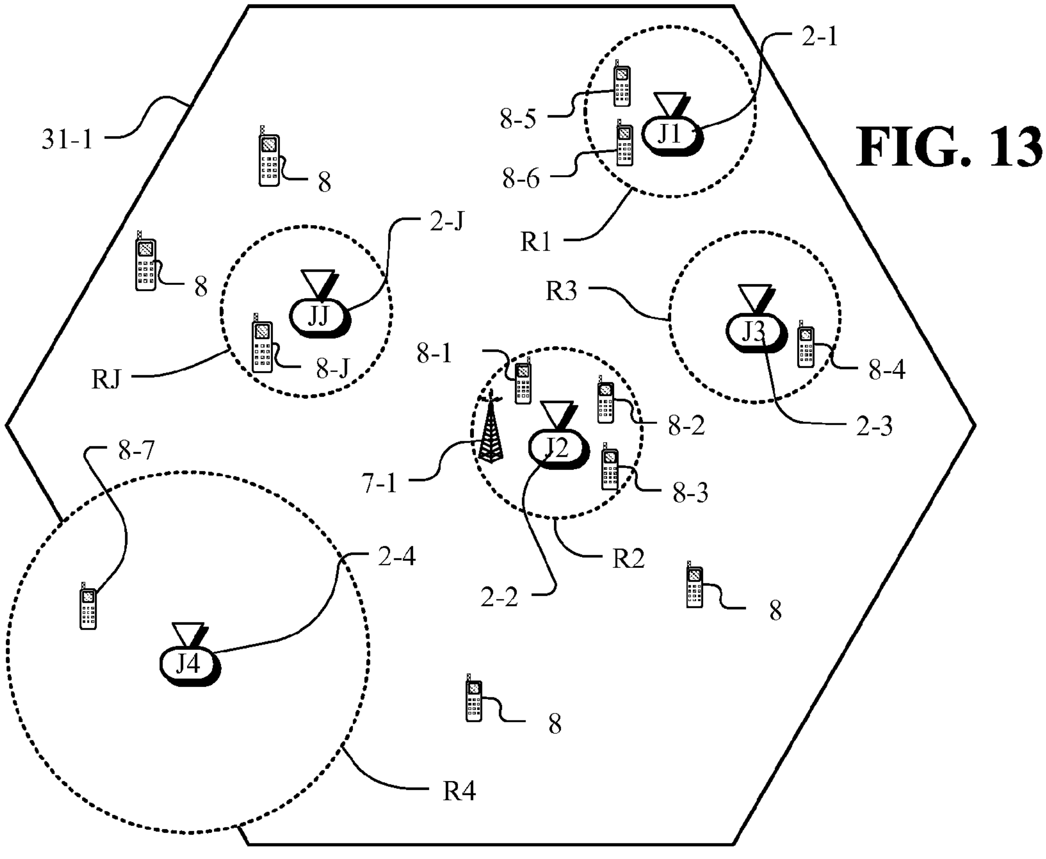
FIG. 13

MULTI-BAND JAMMER INCLUDING AIRBORNE SYSTEMS

CROSS REFERENCE

This application is a continuation in part of and claims priority to the application entitled MULTI-BAND JAMMER, Ser. No. 11/522,300, Filed Date Sep. 15, 2006 now U.S. Pat. No. 7,697,885, and Published No US 2009-0237289 A1, Published Date Sep. 24, 2009.

TECHNICAL FIELD

The present invention relates to RF transmitters and receivers in environments where inhibiting of RF communications is desired and further relates to RF jammers that jam communications with local mobile stations thus preventing such local mobile stations from communicating or otherwise from initiating any action.

BACKGROUND OF THE INVENTION

RF transmitters and receivers have become widely available and deployed for use in many applications including many commercial products for individuals such as cellular hand sets ("mobile stations"), garage door openers, automobile keyless entry devices, cordless handsets and family radios. RF transmitters and receivers are also widely deployed in more complex commercial, safety and military applications. Collectively, the possible existence of many different RF transmissions from many different types of equipment presents a broadband RF transmission environment.

In light of the increasing large deployment of many different types of RF transmitters and receivers, the particular RF signals and signal protocols that may be present in any particular local area potentially are quite complex. Cellular systems, in particular, are of high interest because of their widespread deployment.

At times in a particular local area, it is desirable that the RF local mobile stations be rendered temporarily inactive thus preventing such local RF mobile stations from initiating transmissions by any associated local RF mobile stations or otherwise from initiating any action.

RF jammers have long been employed for temporarily rendering local RF mobile stations inactive. However, the large deployment of many different types of RF transmitters and receivers has rendered conventional jammers ineffective in many RF environments.

Jamming is usually achieved by transmitting a strong jamming signal at the same frequency or in the same frequency band as that used by the targeted local receiver. The jamming signal may block a single frequency, identified as "spot jamming", or may block a band of frequencies, identified as "barrage jamming".

Although simple jammers have long existed, technological advances require the development of advanced jamming equipment. Early jammers were often simple transmitters keyed on a specific frequency thereby producing a carrier which interfered with the normal carriers at targeted local receivers. However, such single carrier jammers have become ineffective and easily avoided using, for example, frequency hopping, spread spectrum and other technologies.

Some jamming equipment has used wide-band RF spectrum transmitters and various audio tone transmissions to jam or to spoof local receivers. Other systems employ frequency tracking receivers and transmitters and utilize several large directional antenna arrays that permit directional jamming of targeted local receivers. Often in such arrays, deep nulls in selected directions are provided to minimize the effects of the jamming in those selected directions. The deep null directions are then used to allow wanted communications.

Some jammers feature several modes of operation and several modulation types. For example, such operational modes include hand keying, random keying, periodic keying, continuous keying and "look through". In the "look through" mode, a special jammer or a separate receiver/transmitter is used to selectively control the keying of the transmit circuit. The "look through" mode can be configured to hard key the transmitter ON at full power output upon detection of a received signal and periodically hard switch the transmitter RF power to OFF. In unkey operations, while the receiver "looks through" to see if there is still a carrier present or, after the transmitter has hard keyed to full output power ON, the RF output of the transmitter is gradually slewed down to a lower level while the receiver "looks through" to detect any carrier activity on the targeted frequency.

In a continuous-wave operation, when a jammer is only transmitting a steady carrier, the jamming signal beats with other signals and produces a steady tone. In the case of single side band (SSB) or amplitude modulated (AM) signals, a howl sound is produced at the receiver. In the case of frequency modulated (FM) signals, the receiver is desensitized, meaning that the receiver's sensitivity (ability to receive signals) will be greatly reduced.

When various types of modulations are generated by a transmitter, the operation is referred to as "Modulated Jamming". The modulation sources have been, for example, noise, laughter, singing, music, various tones and so forth. Some of the modulation types are White Noise, White Noise with Modulation, Tone, Bagpipes, Stepped Tones, Swept Tones, FSK Spoof and Crypto Spoof.

The jammers that are actually deployed have tended to be either barrage jammers broadcasting broadband noise or CW (continuous wave) signals targeted at specific known signals. Generally, barrage jammers tend to produce a low energy density in any given communications channel, for example a 25 kHz channel, when jamming a broad band of channels. By way of example, a 200 MHz barrage jammer transmitting 100 Watts generally will only have 12 mWatts in any communications channel and this low power level per channel is likely to be ineffective as a jammer. These jammers also tend to jam wanted communications.

A regenerative jammer is disclosed in an application entitled REGENERATIVE JAMMER WITH MULTIPLE JAMMING ALGORITHMS, with filed date of Mar. 24, 2006 and with SC/Ser. No. 11/398,748, now U.S. Pat. No. 7,532,856. The regenerative jammer generates and transmits RF broadband jamming signals for jamming one or more local RF receivers. The jammer includes a broadband antenna unit for receiving broadband RF jammer received signals from local transmitters and for transmission of regenerated broadband RF jamming signals to the local receivers. The antenna unit includes one or more antennas for separately transmitting and receiving. The jamming signals use a plurality of jamming algorithms including a regeneration algorithm for jamming local receivers.

The jamming of cellular systems is of particular interest because of the high number of cellular mobile stations that are presently deployed and that are increasingly being deployed.

Cellular systems "reuse" frequencies within a group of cells to provide wireless two-way radio frequency (RF) communication to potentially large numbers of users at mobile stations (often called "cell mobile stations" and "hand sets").

Each cell covers a small geographic area (up to about 35 kilometers and typically much smaller in urban areas) and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the mobile station capacity required. Cells are connected to each other via land lines, microwave links, switches or other means that are adapted for mobile communication. Switches provide for the hand-off of mobile stations from cell to cell and thus typically from frequency to frequency as mobile stations move between cells.

In conventional cellular systems, each cell has a base station (BTS) with RF transmitters and RF receivers co-sited for transmitting and receiving communications to and from mobile stations in the cell. The base station employs forward RF frequency bands (carriers) to transmit forward channel communications to mobile stations and employs reverse RF carriers to receive reverse channel communications from mobile stations in the cell.

The forward and reverse channel communications use separate frequency bands so that simultaneous transmissions in both directions are possible. This operation is referred to as frequency division duplex (FDD) operation. In time division duplex (TDD) operation, the forward and reverse channels take turns using the same frequency band.

The base station in addition to providing RF connectivity to users at mobile stations also provides connectivity to other base stations through a switch or other facility sometimes called an Office. In a typical cellular system, one or more such Offices will be used over the covered region to service a number of base stations and associated cells in the cellular system and to support switching operations for routing calls between other systems and the cellular system or for routing calls within the cellular system. An Office assigns RF carriers to support calls, coordinates the handoff of mobile stations among base stations, and monitors and reports on the status of base stations. The number of base stations controlled by a single Office depends upon the traffic at each base station, the cost of interconnection between the Office and the base stations, the topology of the service area and other similar factors.

A handoff between base stations occurs, for example, when a mobile station travels from a first cell to an adjacent second cell. Handoffs also occur to relieve the load on a base station that has exhausted its traffic-carrying capacity or where poor quality communication is occurring. The handoff is a communication transfer for a particular mobile station from the base station for the first cell to the base station for the second cell.

Conventional cellular implementations employ one of several techniques to reuse RF bandwidth from cell to cell over the cellular domain. The power received from a radio signal diminishes as the distance between transmitter and receiver increases. Conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere with the carrier in the given cell. The determination of how far away reuse sites must be and of what constitutes significant interference are implementation-specific details for the communication system.

In TDMA conventional cellular architectures, time is divided into time slots of a specified duration. Time slots are grouped into frames, and the homologous time slots in each frame are assigned to the same channel. It is common practice to refer to the set of homologous time slots over all frames as a time slot. Each logical channel is assigned a time slot or slots on a common carrier band. The radio transmissions carrying the communications over each logical channel are thus discontinuous. The radio transmitter is off during the time slots not allocated to it.

Each separate radio transmission, which occupies a single time slot, is called a burst. Each TDMA implementation defines one or more burst structures. Typically, there are at least two burst structures, namely, a first one, an access burst, for the initial access and synchronization of a mobile station to the system, and a second one, a normal burst, for routine communications once a mobile station has been synchronized. Strict timing must be maintained in TDMA systems to prevent the bursts comprising one logical channel from interfering with the bursts comprising other logical channels in the adjacent time slots.

GSM signals are TDMA bursts with digital GMSK modulation format. The bit duration is about 3.7 μsec with about 156 bits forming a 0.577 msec burst in a TDMA time slot. A specific user is assigned one burst every 4.615 msec. The mobile stations transmit and receive at different RF frequencies. For example, in most of the world, including Europe, the mobile station transmits in the bands from 890 to 915 MHz and 1710 to 1785 MHz and receives in the bands from 935 to 960 and 1805 to 1880 MHz. The signals are allocated to channels within their transmit bands. The channel spacing is 0.2 MHz. The 1800 MHz mobile station transmit band has 75 MHz/0.2 MHz=375 channels available and similarly 375 channels for the receive band.

In some parts of the world, including the US and Canada, the GSM network uses the 800 and 1900 MHz bands. In the 800 MHz band, the mobile station transmits from 824 to 849 MHz and receives from 869 to 894 MHz. In the 1900 MHz band, the mobile station transmits from 1850 to 1910 MHz and receives from 1930 to 1990 MHz.

In operation of a GSM communication system, the system detects signal problems with a mobile station, such as high bit errors or loss of reception, and then commands the mobile station to change to a new RF channel. This new RF channel may be in the same band or may be in the other band. For example, if the mobile station is using 901.2 MHz and experiences difficulty, the system may command it to change to 893.4 MHz. Due to capacity and system loading, the mobile station may be commanded to use 1782.4 MHz in the upper band. These channel changes happen without detection by the user of the mobile station. GSM systems also have frequency hopping provisions where the channels are changed periodically to avoid interference.

Notwithstanding the advancements that have been made in jamming systems, GSM and other communication systems present a demanding need for more effective jammers. GSM jammers generally fall into three categories: continuous wave (CW), noise and modulated. The goal of these jammers is to have the mobile station receive enough jammer signals with sufficient power compared to the intended GSM signal from the base station, to prevent the intended signal from being demodulated properly. The mobile station does nothing when it does not recognize the received signal.

CW jammers generate a sinusoidal signal using a signal generator, for example, using a direct digital synthesis (DDS)

chip. DDS chips can quickly tune to a commanded frequency and generate a sinusoidal signal. This sinusoidal signal is amplified with a power amplifier and transmitted via an RF antenna. The advantage of a DDS is that it is relatively inexpensive to generate the RF jammer signal. The disadvantages of a DDS are that a) the jammer system must know which channels to jam requiring an involved signal processing system and b) the jammer system requires a large number of DDS's to cover all the possible active mobile station receive channels.

Noise jammers produce broadband white noise filtered to the bands of interest, usually the mobile station receive channels. This band limited signal is amplified with a power amplifier and transmitted. An advantage of this noise jammer system is that the noise generator generates the signal at the RF frequency and covers a broad band. This noise jammer system only needs one signal generator to cover a wide band of frequencies. A disadvantage of the noise jammer system is that the noise density is low. For example, if a 10 Watt power amplifier is used to transmit the signal in the mobile station receive band, only about 20 mW of jamming signal power is actually transmitted in each channel. This low power produces a limited effective jammer range.

Modulated signal jammers use modified GSM mobile station circuitry and software to transmit a GSM type signal on active channels. This mobile station circuitry is inexpensive, but the number of mobile stations that can be jammed at one time is limited. Further, the mobile station circuitry has limited transmit power and therefore has a limited effective range.

Whenever a jammer starts operating, the GSM system will detect the interference and command the mobile station to change to a different channel frequency. This hand-off of a mobile station, if allowed to proceed, is made in milliseconds. Similarly, when frequency hopping is employed, the jammer must be able to respond to the new hopped to channel. Accordingly, any jammer must deal with the channel hand-off, frequency hopping and other dynamic operation of communication systems.

To be effective in jamming the dynamic operation of a communication system, a jammer must track changes to new channels and block the new channels, detect and jam all active channels or jam all possible channels. Furthermore, when the system detects a bad TDMA burst, it will retransmit the burst on the same or a different channel. Therefore, to be effective, the jammer must hit all TDMA bursts. Known systems do not satisfy these requirements.

The GSM jammer can be applied to airborne electronic countermeasure (ECM) platforms. An ECM aircraft is able to fly over target areas with an aiming precision for the jamming signal beams which can be as small as a few meters at a distance from the aircraft of several kilometers. The ECM systems jam radio and cell phone traffic for miles around and thereby disrupt insurgent communications. Potentially, the ECM aircraft also can disrupt the jammers used by ground-based squads to prevent detonation of improvised explosive devices (IEDs). Potentially, crossed signals can accidentally detonate IEDs.

In environments where multiple jamming systems are present for jamming IEDs (Improvised Explosive Devices) and for jamming other signals, there is a need for coordination among the systems. Also, coordination is beneficially extended to surveillance and communications systems to prevent interference and loss of control links In light of the foregoing background, there is a need for improved transmitters, receivers and jammers that are effective in local areas, and in particular are effective for GSM and other digital environments.

SUMMARY OF THE INVENTION

The present invention is an airborne jammer for transport by an aircraft for jamming communications in a communications system where the communications system operates with digital bursts having burst periods measured in time and occurring in a communication frequency band such as GSM. The jammer includes a tone comb generator for providing repetitions of jamming signals for the communication frequency band having a transmit band and a receive band where the jamming signals have jamming signal intervals providing frequency separation between the jamming signals. The jamming signals are generated with a dwell time substantially less than a burst period for the communications system. A converter converts the jamming signals to RF jamming signals in the communication frequency band and a transmitter transmits the RF jamming signals to jam communications for mobile stations.

In an embodiment, the dwell time is about 20% or more of a burst period for the communications system. With such dwell time, the power employed is approximately 20% of the power required for dwell times equal to 100% of the burst period.

In an embodiment, the jamming signals are generated concurrently for the transmit band and the receive band and in another embodiment the jamming signals are generated for only one of the transmit band and the receive band.

In an embodiment, the transmitter transmits with a "look through" period when jamming signals are not transmitted and the "look through" period of each transmitter occurs at a common time.

In an embodiment, a control unit sends synchronizing signals to each jammer for synchronizing the "look through" period of each transmitter.

In an embodiment, one jammer is a master jammer having a control unit where the control unit operates to detect other ones of the jammers and to send synchronizing signals to the other ones of the jammers to establish a "look through" period for each jammer synchronized to a common period.

In an embodiment, a jammer is an airborne jammer having a control unit where the control unit operates to detect the location of one or more base stations and to focus the jamming signals from the airborne jammer to regions including the one or more base stations.

The foregoing and other objects, features and advantages of the invention will be apparent from the following detailed description in conjunction with the drawings.

BRIEF DESCRIPTION OF THE DRAWINGS

FIG. 12 depicts a region including a plurality of wireless cells.

FIG. 13 depicts an expanded view of one of the cells of FIG. 12.

DETAILED DESCRIPTION

Figure 1:
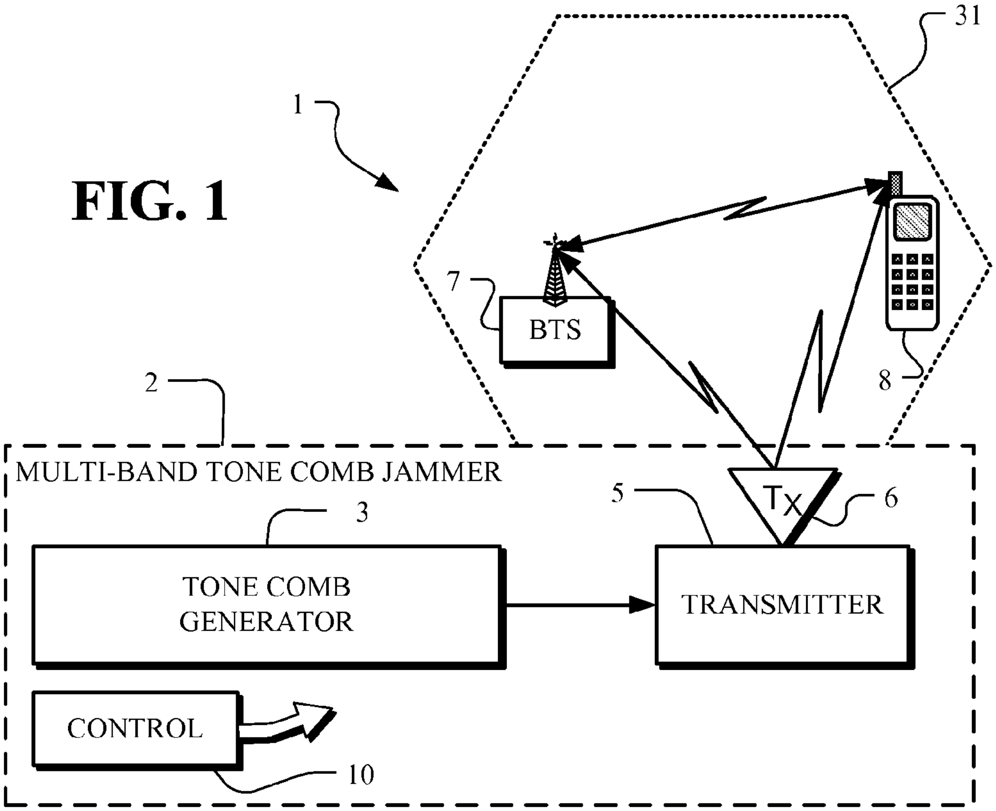
FIG. 1 depicts a schematic block diagram of a tone comb jammer transmitting to a mobile station and a base station.

In digital systems, such as GSM systems, the signals are digital in nature having a number of bits per burst. Communications are jammed by jamming a small number of bits in each burst. The jamming of a small number of bits confuses the mobile station and/or the base station so that in either case the communications are prevented or stopped.

If the jamming burst is too short, the communication system may use Error Correction Coding (ECC) or otherwise overcome the disturbance to compensate for the short burst of bad bits such that the jamming is ineffective. If the jammer burst is too long, the system is wasting RF power that, particularly for battery operated portable jamming system, is in short supply.

It has been found experimentally that if the jammer jams 20% of every TDMA burst in a GSM system for any particular mobile station, the communications for that mobile station are prevented or stopped. In order to jam 20% of every TDMA burst where each burst has a burst period of 577 μsec, the jammer dwells for a dwell period equal to (577 μsec) (0.20), that is, dwells cumulatively for 115.4 μsec for each 577 μsec burst. While jamming a signal for 20% or greater of the burst time works well, shorter dwells are operative in some systems and some environments.

In order to achieve a 20% jamming signal dwell, jammer signals in a tone comb are employed. The tone comb is formed of continuous wave (CW) tones or modulated tones. The modulation is AM, FM, digital modulation or other modulation. In one particular embodiment, the jammer signals have a jammer signal interval of 0.1 MHz with two jammer signals per 200 kHz channel. Ten of the jammer signals form a 1 MHz jammer signal set which covers five 200 kHz GSM channels. The 1 MHz jammer signal set is repeated a first 75 or more repetitions to cover the first one of the 75 MHz bands and is repeated a second 75 or more repetitions to cover the second one of the 75 MHz bands of the 1800 MHz GSM system. The pair of 75 or more repetitions is generated, for example, using 75 from the lower sideband and 75 from the upper sideband of an up-converted 75-tone baseband signal. In one further embodiment, an additional jammer signal repetition is added to each of the first and second 75 repetitions thereby having 76 repetitions for each 75 MHz band for a total of 152 repetitions for the entire 1800 MHz GSM system. The additional two repetitions overcome any edge effects or alignment criticality that might otherwise exist in some environments. The tone comb with 152 repetitions covers the entire transmit and receive bands of the 1800 MHz GSM communication system. Similarly in the case of the 900 MHz GSM band, the GSM transmit and receive bands are 25 MHz wide each using 26 tones separated by 1 MHz. To cover both the transmit and the receive bands; the 900 MHz GSM band jammer signals require 52 tones. If the GSM system uses the extended frequency coverage from 925 to 935 MHz, an additional 10 tones will be needed to jam the tower down link.

In one embodiment described, the tone comb signals are stored and retrieved with 100 kHz jammer signal intervals, each interval one-half of a GSM 200 kHz channel bandwidth. Such 100 kHz jammer signal intervals provide two jammer signals per GSM 200 kHz channel. Such two jammer signals per channel avoids any jammer signal frequency alignment sensitivity and alignment of the jammer signal frequencies with the GSM 200 kHz channel center frequencies is not required.

In another embodiment, the tone comb signals are stored and retrieved with 200 kHz jammer signal intervals, each interval equal to a GSM 200 kHz channel bandwidth. A tone comb with a 200 kHz jammer signal interval performs less efficiently than a tone comb with a 100 kHz jammer signal interval. However, a 200 kHz jammer signal interval uses one-half the total RF transmitted power than required by a 100 kHz jammer signal interval. Such power savings in exchange for performance may be advantageous in some circumstances.

In FIG. 1, the tone comb jammer 2 generates and transmits a tone comb signal to a region that is part of a digital communication system 1. The system 1 is typically a cellular system and, by way of an example in the present specification, is a GSM cellular system having one or more cells of which cell 31 is typical. The cell 31 includes a base station (BTS) 7 and a mobile station 8 where mobile station 8 is typical of many mobile stations potentially in the cell 31. The tone comb signal from the tone comb jammer 2 extends across the entire frequency spectrum of the system 1. Any desired frequency band may be jammed by the tone comb jammer 2. In one example described in the present specification, the frequency band is the 1710 MHz to 1880 MHz band of the 1800 MHz GSM system.

The tone comb jammer 2 of FIG. 1 includes a tone comb generator 3 for providing tone signals and a transmitter 5 including an RF antenna 6 for transmitting the RF signals. The tone comb jammer 2 transmits across the frequency band of communication system 1 and hence across the 1710 MHz to 1880 MHz band for GSM signals. This band includes transmit and receive bands for the base station 7 and transmit and receive bands for each mobile station as represented by mobile station 8.

Figure 2:
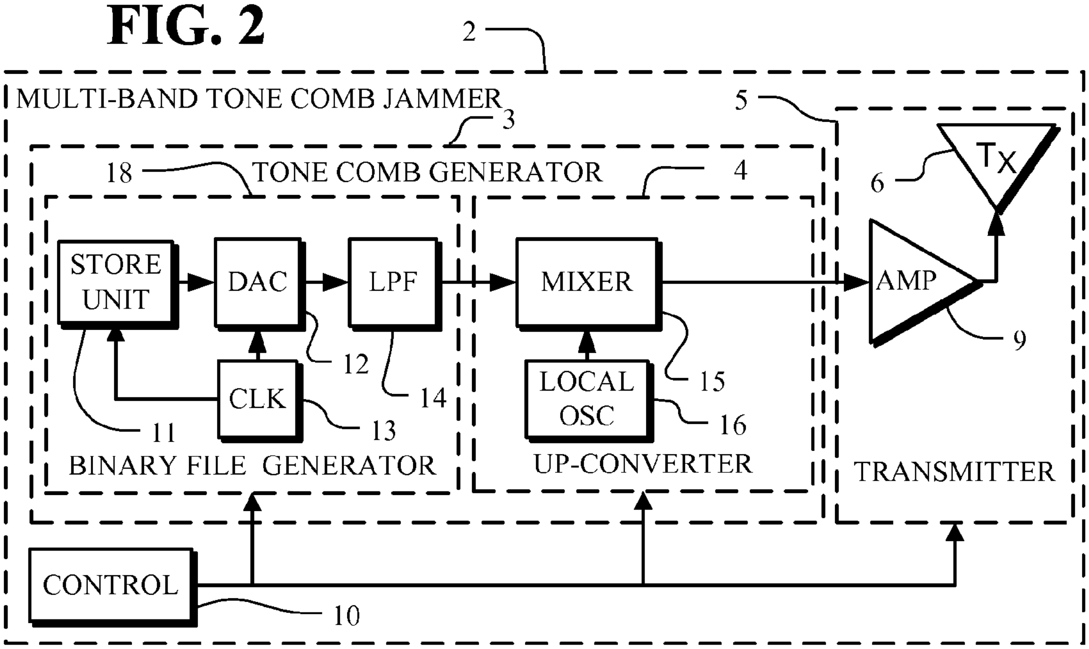
FIG. 2 depicts a more detailed schematic block diagram of one embodiment of the tone comb jammer of FIG. 1.

In FIG. 2, further details of the tone comb jammer 2 of FIG. 1 are shown. The tone comb generator 3 includes a binary file generator 18 and an up-converter 4. The binary file generator 18 includes a digital store unit 11 for storing binary data in a random access memory and for addressing and accessing the binary data to provide jammer signals. The random access memory stores the jamming signals in binary files, a different binary file for each different communication frequency band. For example, one binary file is stored for the 900 MHz GSM communication frequency band and another binary file is stored for the 1800 MHz GSM communication frequency band. The stored binary files are identified as parameters that are used to control the communication frequency band that is to be jammed by the jammer. In one example, the jammer signals are generated using a computer for scaling the binary data to 12 bits so that the binary data in unit 11 has values from −2048 to +2047 and thus provides sufficient dynamic range in the jammer signals to jam GSM signals.

The signals stored in unit 11 are composite tone signals formed, for example, by combining a set of randomly phased sinusoids. The composite tone signals are stored and accessed from unit 11 in response to clock 13 so as to be provided with the desired jammer signal interval, for example 100 KHz, The signal from unit 11 is processed by digital-to-analog converter (DAC) 12 using a 200 M sample/second sample rate from clock (CLK) 13. The DAC generates a tone comb baseband signal from 10 MHz to 85 MHz. Reconstruction low pass filter 14 smoothes off discontinuities and eliminates the higher order harmonics in the signal from DAC 12. The baseband signal is up-converted by up-converter 4. The up-converter 4 includes a mixer 15 and local oscillator 16 providing a 1795 MHz signal to the mixer 15. The up-conversion of the baseband signal from 10 MHz to 85 MHz provides the up-converted tone comb RF signal from 1710 MHz to 1880 MHz as needed to jam the GSM 1800 MHz frequency band. The resultant tone comb RF signal from filter 17 is amplified by power amplifier 9 and transmitted by the antenna 6.

In FIG. 2, control unit 10 is provided to control and determine the operation of the binary file generator 18, the up-converter 4 and the transmitter 5. For example, when a different frequency band is to be jammed, when a different jammer signal interval is to be used or when the sampling rate is to be changed, the control unit provides the appropriate controls to tone comb generator 3 and transmitter 5. Each of the frequency bands to be jammed is stored in a different file location in the random access memory of unit 11 and control unit 10 directs the addressing to the file location having the desired jamming signal parameters. Similarly, control unit 10 specifies the correct local oscillator frequency for local oscillator 16 and functions to control the on/off state and other parameters of transmitter 5.

Figure 3:
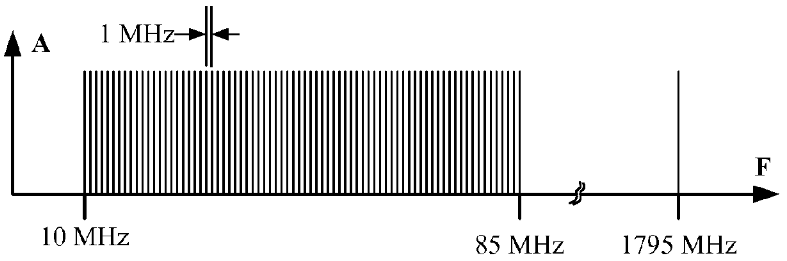
FIG. 3 depicts a baseband tone comb spectrum for 1800 MHz jamming.

In FIG. 3, a baseband tone comb spectrum for 1800 MHz jamming has 76 tones from 10 MHz to 85 MHz which are up-converted with the local oscillator frequency at 1795 MHz. The tones in FIG. 3 have 1 MHz spacing.

Figure 4:
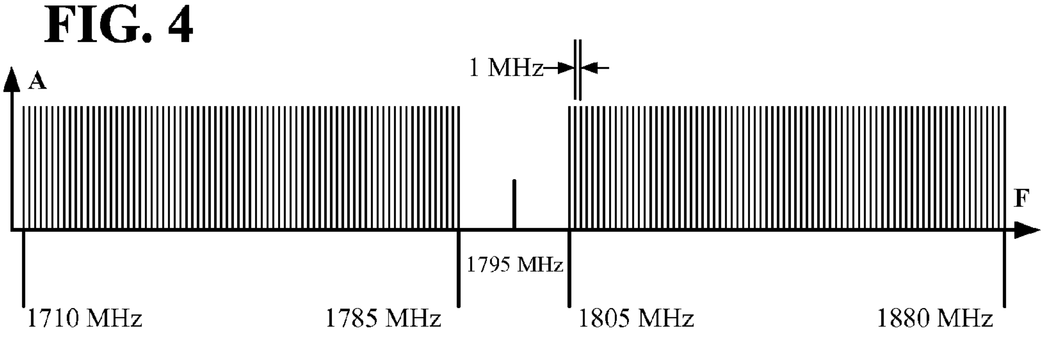
FIG. 4 depicts an up-converter output spectrum after up-converting the baseband signal with the tone comb spectrum of FIG. 3.

In FIG. 4, the up-converter output spectrum, as a result of up-converting the baseband signal with the tone comb spectrum of FIG. 3 in the mixer 15 of FIG. 2 with the local oscillator frequency at 1795 MHz, includes the lower sideband from 1710 MHz to 1785 MHz and includes the upper sideband from 1805 MHz to 1880 MHz.

In FIG. 4, the mixer 15 of FIG. 2 produces both negative, lower, and positive, upper, side bands by multiplying the local oscillator 1795 MHz signal with the input baseband signal. For example, when the input baseband signal is a continuous wave (CW) sine wave with a frequency f and the local oscillator has a frequency $f_{LO}$, the output of the mixer, s(t), is as follows:

$$s(t)=[\cos(2\pi ft)][\cos(2\pi f_{LO}t) \quad \text{Eq. (1)}$$

From Eq. (1), $$s(t)=0.5\cos 2\pi(f_{LO}-f)t+0.5\cos(2\pi(f_{LO}+f)t \quad \text{Eq. (2)}$$

In Eq. (2), $0.5\cos 2\pi(f_{LO}-f)t)$ is the lower sideband and $0.5\cos(2\pi(f_{LO}+f)t$ is the upper sideband. Leakage from the local oscillator 16 in FIG. 2 appears at the 1795 MHz frequency in the spectrum of FIG. 4. The lower sideband from 1710 MHz to 1785 MHz has 76 tones and the upper sideband from 1805 MHz to 1880 MHz has 76 tones.

Figure 5:
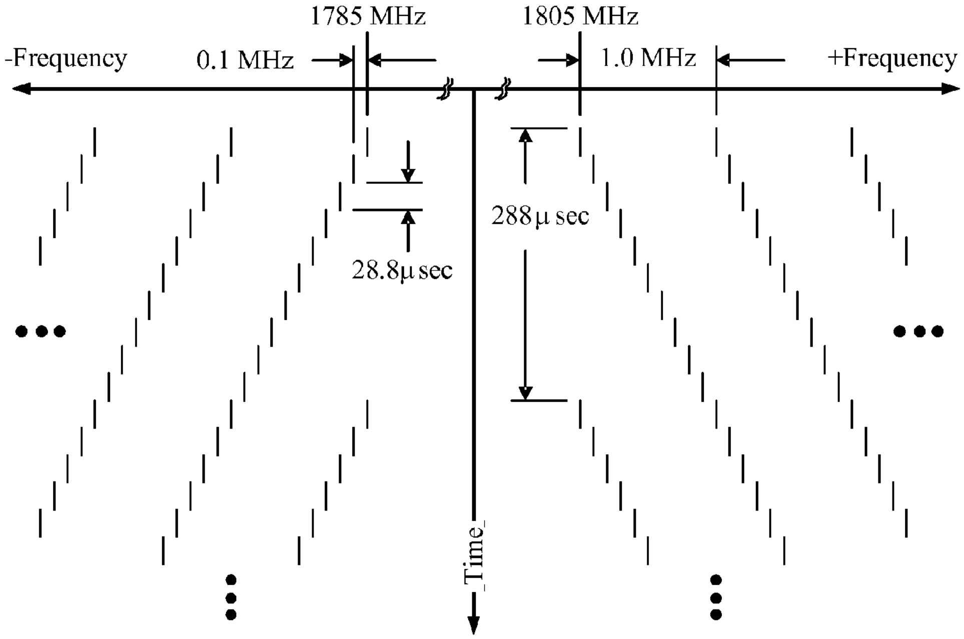
FIG. 5 depicts a representative sample of the tone comb jammer signals from the tone comb jammer of FIG. 2.

FIG. 5 depicts a representative sample of the tone comb jammer signals of FIG. 4. In FIG. 5, the sample of tone comb jammer signals is shown for approximately a +2 MHz period starting at 1805 MHz and a −2 MHz period starting at 1785 MHz. The tones are both in the transmit band (1710 MHz to 1785 MHz) represented by "−Frequency" relative to 1795 MHz and in the receive band (1805 MHz to 1880 MHz) represented by "+Frequency" relative to 1795 MHz. Each of the tones lasts for a dwell time duration of 28.8 μsec. After 28.8 μsec, each tone changes frequency by a jamming signal frequency interval equal to 100 kHz to become a new tone that again lasts for a dwell time duration of 28.8 μsec. All of the tones in FIG. 5 occur at the jamming signal frequency interval 0.1 MHz (horizontal axis) for 28.8 μsec dwell time durations (vertical axis). The pattern repeats at 1.0 MHz intervals in frequency and repeats every 288 μsec in time.

Figure 6:
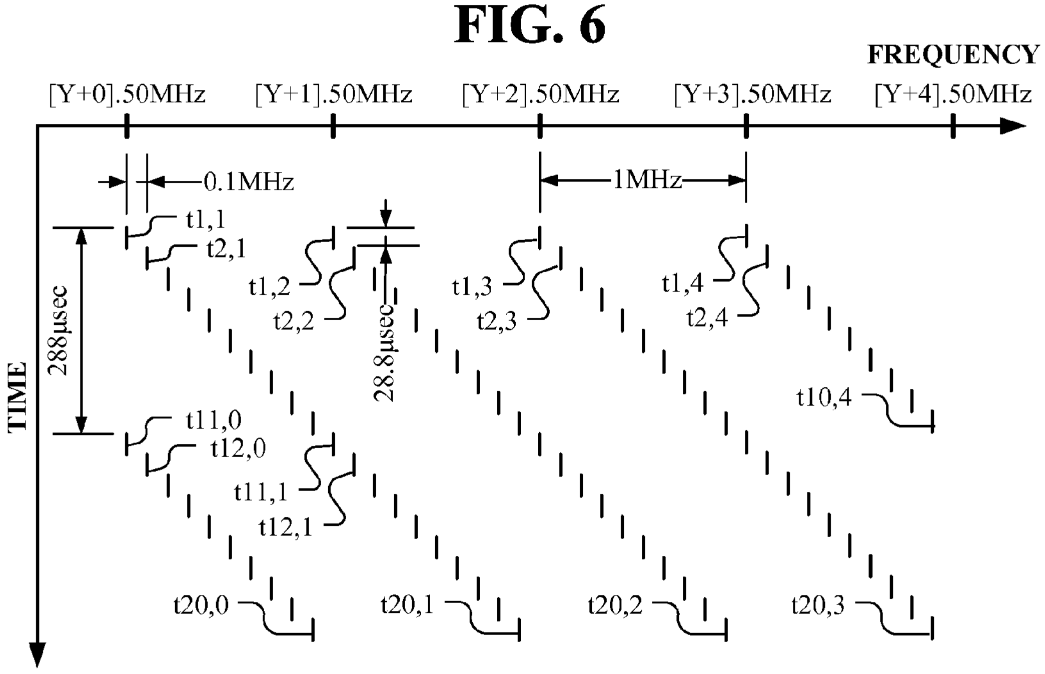
FIG. 6 depicts an expanded view of the upper sideband representative sample of the tone comb jammer signals of FIG. 5.

In FIG. 6, a representative sample of the tone comb jammer signals from tone comb jammer of FIG. 2 is shown for an approximately 4 MHz period of the upper sideband frequency by way of example. The lower sideband operates in an analogous manner. If Y is a value in MHz of a channel frequency in the upper sideband active communication bands, then the FIG. 6 representation is for [Y+0]0.05 MHz, [Y+1]0.05 MHz, [Y+2]0.05 MHz, [Y+3]0.05 MHz and [Y+4]0.05 MHz. An analogous representation for the lower sideband is for [Y−0]0.05 MHz, [Y−1]0.05 MHz, [Y−2]0.05 MHz, [Y−3]0.05 MHz and [Y−4]0.05 MHz The values of Y are both in the transmit band from 1710 MHz to 1785 MHz and in the receive band from 1805 MHz to 1880 MHz. By way of example, assume for purposes of illustration that Y=1805 MHz in the receive band. With such assumption, the values of [Y+0]0.05 MHz, [Y+1]0.05 MHz, [Y+2]0.05 MHz, [Y+3] 0.05 MHz and [Y+4]0.05 MHz are 1805.50 MHz, 1806.5 MHz, 1807.50 MHz, 1808.50 MHz and 1809.50 MHz, respectively. In the example, the first tone t1,1 at 1805.50 MHz lasts for a duration of 28.8 μsec. After 28.8 μsec, t1,1 changes frequency by 100 kHz to become t2,1 which occurs at 1805.60 MHz and lasts for a duration of 28.8 μsec. All of the tones t1,1, t2,1, . . . , t20,1 occur at 0.1 MHz intervals (horizontal axis) for 28.8 μsec durations (vertical axis). The pattern repeats at 1.0 MHz intervals. The tones t1,1, t2,1, . . . , t20,1 starting at 1805.50 MHz have analogous tones t1,2, t2,2, . . . , t20,2 at a 1.0 MHz offset starting at 1806.50

MHz and have analogous tones t1,3, t2,3, . . . , t20,3 at another 1.0 MHz offset starting at 1807.50 MHz. The tones as shown for the sample of period from 1805.50 MHz to 1809.50 MHz are repeated for the active range 1710 MHz to 1880 MHz for the GSM 1800 MHz frequency band as shown in FIG. 7.

Figure 7:
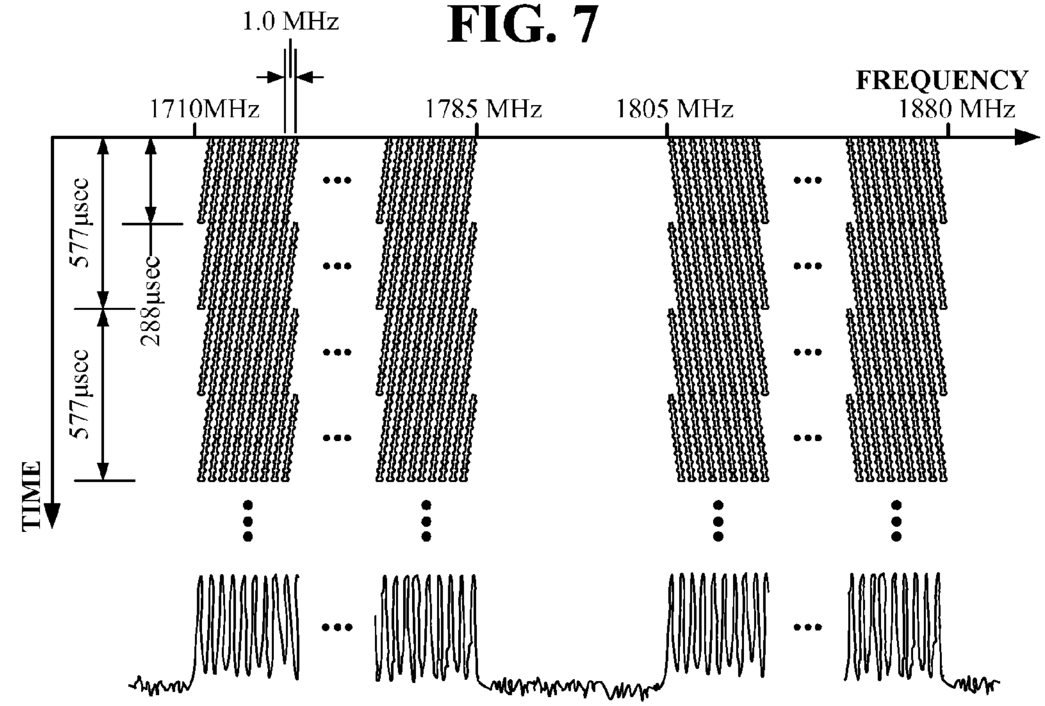
FIG. 7 depicts a representation of the tone comb jammer signals of FIG. 5 extended for the entire GSM 1800 MHz system.

In FIG. 7, the active range for the GSM 1800 MHz frequency band is from 1710 MHz to 1785 MHz and from 1805 MHz to 1880 MHz. The tone signals of the type shown in FIG. 5 and FIG. 6 are provided over the active range. The bottom part of FIG. 7 is the last spectrum of the signal in the top part. Note that all of the power is in the active range from 1710 MHz to 1785 MHz and from 1805 MHz to 1880 MHz and no power is allocated for frequencies below 1710 MHz, in the range from 1785 MHz to 1805 MHz or above 1880 MHz. While FIG. 7 depicts jamming signals covering the entire 1800 MHz GSM communication frequency band, any subset of that band can be employed. The full band or a subset thereof is a selectable parameter of the tone comb jammer. In FIG. 7, the repetition of jamming signals in frequency occurs 76 times for the lower sideband from 1785 MHz to 1710 MHz and 76 times for the upper sideband from 1805 MHz to 1880 MHz. As shown in FIG. 5 and FIG. 6, each set that is repeated 76 times in frequency includes the 10 tones having a 0.1 μsec jamming signal frequency interval with each tone having a 28.8 μsec dwell time. The repetition of jamming signals repeats in time every 288 μsec, that is, twice per 577 μsec burst period.

In some cases, it may be desired to jam only the mobile station up link (890 to 915 MHz for low band and 1710 to 1785 MHz for the high band) or only the base station down link (935 to 960 MHz for the low band and 1805 to 1880 MHz for the high band). This operation of only jamming the up link or the down link saves half of the transmit power over a system jamming both uplink and downlink signals.

Figure 8:
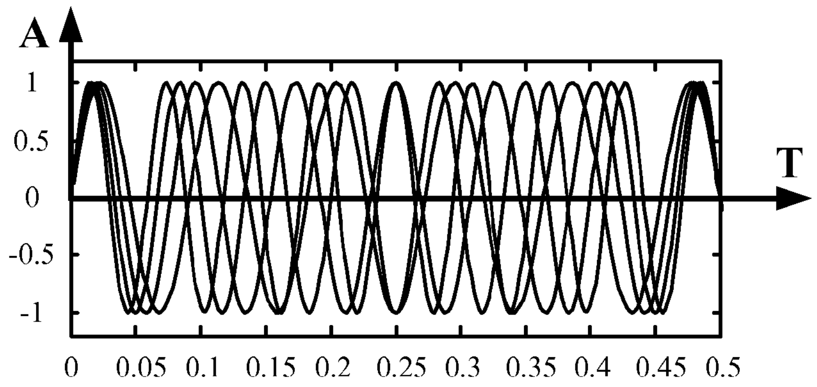
FIG. 8 depicts a representation of a sample of four signals with non-randomized phase used to generate the tone comb jammer signals of FIG. 7.
Figure 9:
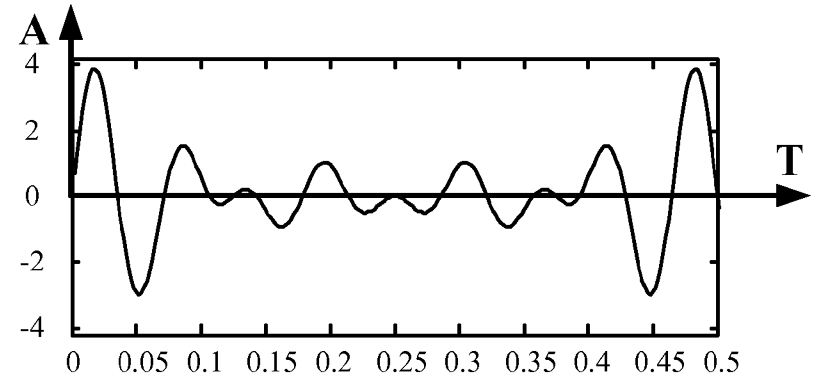
FIG. 9 depicts a representation of a composite of the signals of FIG. 8.

In FIG. 8, the four sine waves at 11, 13, 15, 17 MHz are shown as individual signals that all have the same phase as shown on an amplitude (A) versus time (T) plot. The composite sum of these signals is representative of the signals stored in unit 11. In FIG. 9, the composite waveform of the four sine waves of FIG. 8 has large peaks at the ends and a weak signal in the middle and the signal envelope varies significantly across a period of the signal. In FIG. 9, the peak signal level is about 4.0 as shown on an amplitude (A) versus time (T) plot. For a 12-bit DAC, the peak output is scaled to 2047 counts.

Figure 10:
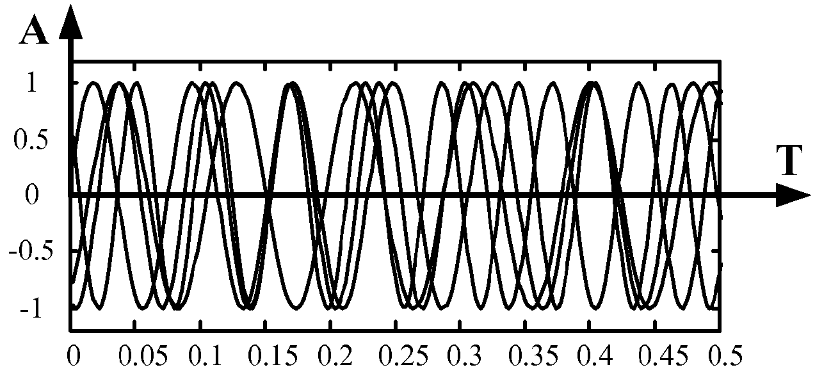
FIG. 10 depicts a representation of a sample of four signals with randomized phase used to generate the tone comb jammer signals of FIG. 7.
Figure 11:
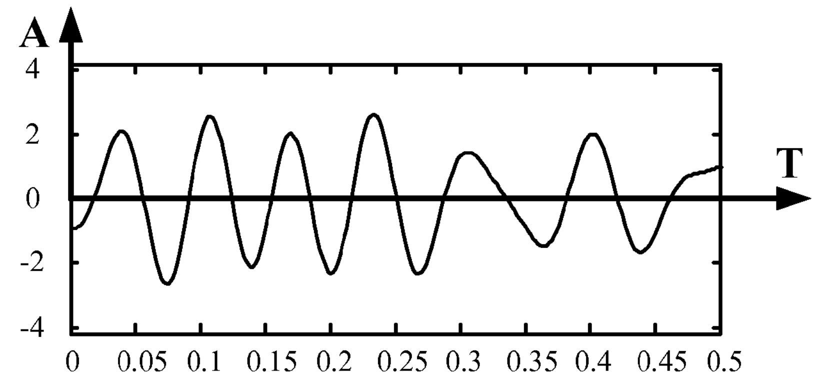
FIG. 11 depicts a representation of a composite of the signals of FIG. 10.

In FIG. 10, the four sine waves at 11, 13, 15, 17 MHz are shown as individual signals that have random phases as shown on an amplitude (A) versus time (T) plot. In FIG. 11, the composite waveform of the four sine waves of FIG. 10 has a uniform envelope where the peak level is 2.6 as shown on an amplitude (A) versus time (T) plot. When this peak level is scaled for a 12-bit DAC, the random phase signal of FIG. 11 has 3.7 dB more signal power than the common phase composite signal of FIG. 9.

In order to provide a composite signal for the 1800 MHz low band GSM example described in the present specification, the four sine wave tone example of FIG. 10 is expanded to a 152 tone embodiment, a first set of 76 tones to cover the band from 1710 to 1785 MHz (75 MHz) and a second set of 76 tones to cover the band from 1805 to 1880 MHz (75 MHz). Each set has a tone repeated at 1 MHz intervals across the respective 75 MHz band. A 20 MHz gap from 1785 MHz to 1805 MHz exists between the two sets of tones as shown in FIG. 7. The sine wave signals used to form the tones have random phases to optimize the output signal power and the signal-to-noise ratio. The 152 tone composite signal with random phases has approximately 14 dB more signal strength than a similar 152 tone signal with constant phase. Similarly, the 52 tone comb used for the 900 MHz band with random phases has approximately 10 dB more signal strength than the signal with constant phases for each tone.

In FIG. 12, the region 41 includes 14 wireless cells 31 and represents a typical GSM cellular system 1 including cell 31 of FIG. 1. Each cell 31 has a size, in one example 15 kilometers wide, and includes a base station 7 and potentially many mobile stations 8. The cell 31-1 in FIG. 12 is typical, and in one embodiment described, includes tone comb jammers J1, . . . , J4 for locally jamming GSM communications to some of the mobile stations 8 as described in further detail in connection with FIG. 13.

In FIG. 13, the cell 31-1 of FIG. 1 and of FIG. 12 includes a base station 7 for GSM communication with a plurality of mobile stations 8 in the range covered for cell 31-1. Also present in FIG. 13 are tone comb jammers J1, J2, J3, J4 and JJ designated 2-1, 2-2, 2-3, 2-4 and 2-J, respectively. The jammer 2-1 has a range R1 of approximately 200 meters and extends to the locations occupied by mobile stations 8-5 and 8-6. The jammer 2-2 has a range R2 of approximately 200 meters and extends to the locations occupied by mobile stations 8-1, 8-2 and 8-3 and also is in close proximity to the base station 7-1. The jammer 2-3 has a range R3 of approximately 200 meters and extends to the location occupied by mobile station 8-4. The jammer 2-4 has a range R4 of approximately 400 meters and extends to the location occupied by mobile station 8-7. The jammer 2-J has a range RJ of approximately 200 meters and extends to the location occupied by mobile station 8-J. The mobile station 8-7 is located at the edge of cell 31-1 and hence at the edge of cell 31-2 (see FIG. 12). In FIG. 13, the operation is as follows. The communications system in FIG. 13, in one particular embodiment, is the 1800 MHz GSM system. The communications system operates with digital bursts between mobile stations 8 and one or more base stations 7-1. The bursts have burst periods measured in time and occur in the 1800 MHz GSM system communication frequency band. The method of operation includes, for each of one or more jammers J1, J2, J3 and J4 as follows. A tone comb is generated to provide repetitions of jamming signals for the communication frequency band where the jamming signals have jamming signal frequency intervals, for example 0.1 MHz, providing frequency separation between jamming signals. The jamming signals are converted to RF jamming signals in both a transmission band, for example 1710 MHz to 1785 MHz, and a receive band, for example 1805 MHz to 1880 MHz, of the communication frequency band, for example 1710 MHz to 1880 MHz. The RF jamming signals are transmitted to the mobile stations 8 and to the base station 7-1 whereby communications by the base stations 8 within the range of the jammers J1, J2, J3 and J4 are jammed.

In FIG. 13, active ones of the mobile stations 8 are operating generally in access mode or in normal mode. In access mode, access bursts are used in order for the mobile station to acquire synchronization with the base station 7-1. In normal mode, normal bursts are used for routine communications after synchronization has been established. Any one or more of the jammers 2-1, 2-2, 2-3, 2-4 and 2-J are turned ON to jam the GSM communications of mobile stations 8 within the respective ranges R1, R2, R3, R4 and RJ, respectively.

In GSM operation, the base station broadcasts on a synchronization channel and on a frequency correction channel to assist mobile stations in becoming synchronized. To become synchronized after receiving the base station transmissions, the mobile station returns access bursts to the base station. If the mobile station is located far from the base station, the received signal at the base station transmitted by the mobile station is weak and if the mobile station is located near to the base station, the received signal at the base station transmitted by the mobile station is strong. Once synchronized, the base station commands the mobile station to use a suitable power level in response to the signal strength level detected by the base station for the mobile station. In FIG. 13, for example, the mobile stations nearer to the base station 7-1, such as mobile stations 8-1, 8-2 and 8-3 are commanded to use low transmission power and mobile stations far from the base station 7-1, such as mobile stations 8-4, 8-5, 8-6 and 8-7 are commanded to use high power.

The near/far differences in signal strength affect the GSM communications and the effectiveness of jammer signals. If a mobile station is located far from a base station, the signal at the mobile station received from the base station is weak. Therefore, in this case it is relatively easy to jam the weak received signal at the mobile station. If the mobile station is close to the base station, the received signal at the mobile station from the base station is strong making the jamming of that received signal at the mobile station difficult or impossible.

If the mobile station is close to the base station and has been synchronized with the base station, then the power level of the transmitted signal from the mobile station to the base station is low. In such a case, the power level of the jamming signal, from the tone comb jammer that is also close to the base station, is set to over power the mobile station transmitted signal. In such a case the base station does not recognize the mobile station and does not communicate with the mobile station.

The near/far differences in signal strength are accommodated by the tone comb jammer by transmitting jamming signals to jam both the downlink signals from the base station to the mobile station and the uplink signals from the mobile station to the base station.

In GSM operation, if the GSM system detects signal problems with a mobile station, such as caused by high bit errors or loss of reception, the system may command the mobile station to change to a different RF channel. For example, if the mobile station is operating in the 1800 GSM band using the 1721.2 MHz band by way of example and experiences signal problems, the system may command the mobile station to change to some other frequency band, 1753.4 MHz for example. Due to capacity, system loading or other reasons, the mobile station may be commanded to use the 900 GSM band. Such channel changes happen without detection by the user of the mobile station. Frequency changes may occur for other reasons. For example, some GSM systems employ frequency hopping where channels are changed periodically to avoid interference and for other reasons.

When a jammer starts operating, the GSM system will detect interference and may command the mobile station to hand-off to a different frequency channel in an attempt to overcome the interference. Hand-offs are made in a few milliseconds and the jammer must deal with channel hand-offs irrespective of the reason for the hand-off. Also, when a GSM system detects a bad TDMA burst, the system may retransmit the burst on the same or a different frequency channel. Therefore, the tone comb jammer operates to hit all TDMA bursts in GSM communications.

In order to be effective, the tone comb jamming signal is generated in both the mobile station transmit and receive bands as shown in the FIG. 7 example from 1710 MHz to 1785 MHz and from 1805 MHz to 1880 MHz. In the case where the mobile stations are far from the base station (mobile stations 8-4, 8-5, 8-6 and 8-7 in FIG. 13), jamming the receive band at the mobile stations is sufficient for preventing GSM communications with those mobile stations. When the mobile stations are close to the base station (mobile stations 8-1, 8-2, and 8-3 in FIG. 13), jamming the mobile station transmitted signal band at the base station is sufficient for preventing GSM communications with those mobile stations.

In some embodiments, the tone comb jammer is portable, lightweight and battery operated. For battery operation, low power consumption is important. In order to achieve efficient and low use of power, the tone comb jammer does not have a tone for every frequency in the communication band at any one time. Rather, the tone comb jammer uses a set of tones where the number of tones in the set is sparse in order to conserve power. The tones in the set are stepped across the entire communication band so that over time all frequencies in the communication band are covered.

Figure 14:
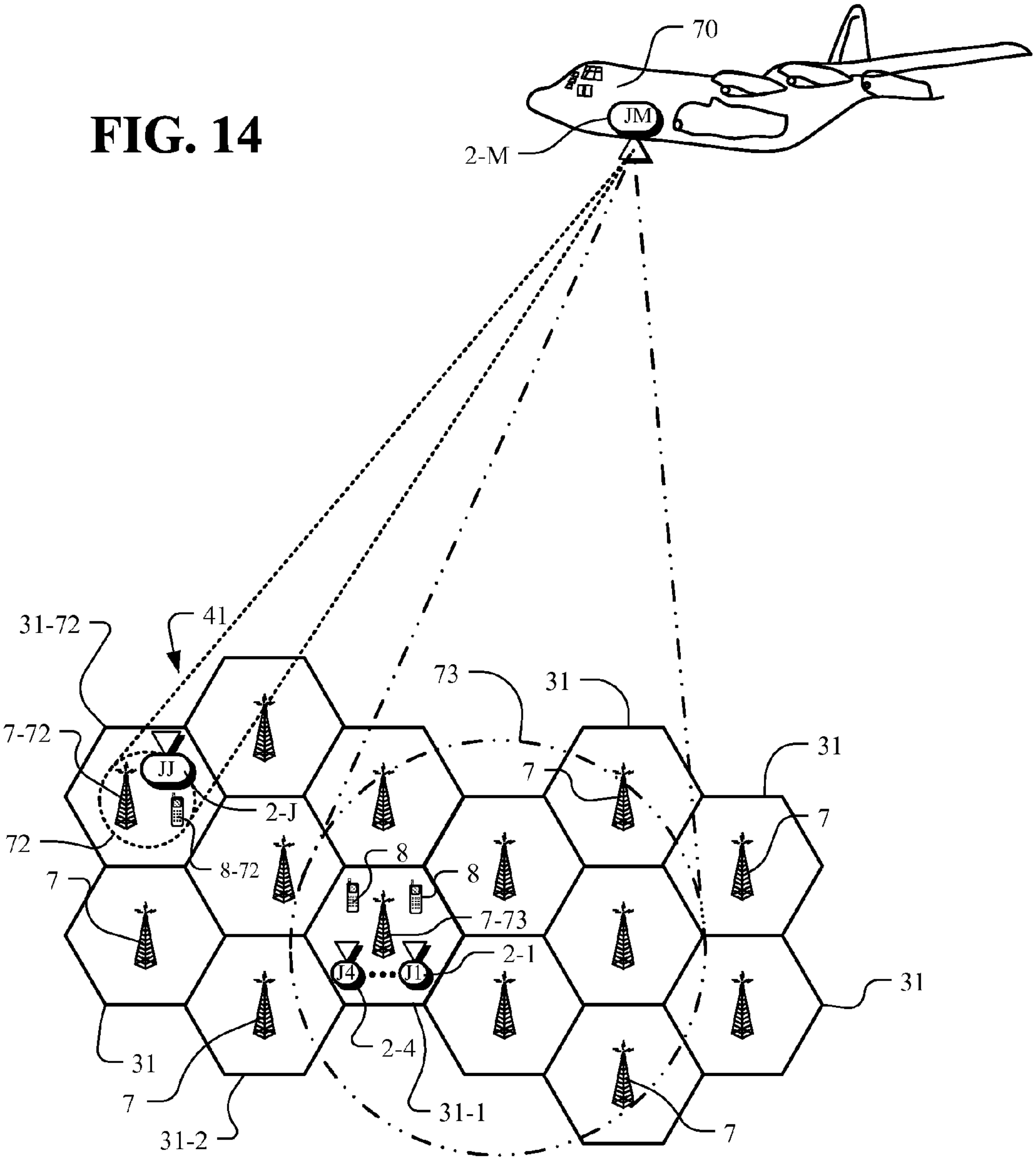
FIG. 14 depicts a schematic representation of an aircraft with an airborne jammer positioned over a target area to transmit jamming signals in one embodiment with a small target area and in another embodiment with a larger target area.

In FIG. 14, a schematic representation of an aircraft 70 with an airborne jammer 2-M (JM) positioned over a target region 41 to transmit jamming signals in one embodiment with a small target area 72 and in another embodiment with a larger target area 73. In FIG. 14, the region 41 includes 14 wireless cells 31 and represents a typical GSM cellular system 1 including cell 31 of FIG. 1. Each cell 31 has a size, in one example 15 kilometers wide, and includes a base station 7 and potentially many mobile stations 8. Cell 31-72, in one example, is targeted by the jammer 2-M of aircraft 70 with a target area 72 of less than 15 kilometers wide and potentially as small as 10's of meters. The cell 31-72 includes base station 7-72. In another example, target area 73 covers a portion of 9 or more cells 31 with a diameter of 40 kilometers or more. In the target area 73, the cell 31-1 is typical, and in one embodiment described, includes tone comb jammers J1, . . . , J4, . . . , JM for jamming GSM communications for some of the mobile stations 8 as described in connection with FIG. 13. The cell 31-73 includes base station 7-73.

In FIG. 14, in replacement of or in addition to the tone comb jammers J1, . . . , J4, . . . , JJ the airborne jammer 2-M in the aircraft 70 operates to provide jamming signals in the targeted regions such as regions 72 and 73. The size of the targeted regions targeted by the jammer 2-M in the aircraft 70 is adjustable to focus on a single base station region such as base station 7-72 or two or more base stations as included, for example, in target area 73. As indicated in connection with the operation of FIG. 13, each of the tone comb jammers J1, . . . , J4, . . . , JJ can operate independently. As suggested in FIG. 14, the jammer 2-M in the aircraft operates together with the other jammers J1, J2, . . . , JJ.

in FIG. 14, the airborne jammer 2-M is able to detect and determine the angle of arrival of strong tower down link signals, for example from the tower of base station 7-72, easier than the detection of relatively weak cell phone uplink signals, for example, from a typical mobile station 8-72. The downlink common channels from the base station 7-72, including the BCCH (Broadcast Control CHannel), are on constantly and do not frequency hop making them easy to detect by airborne jammer 2-M. Under these conditions, the airborne jammer 2-M is commanded to jam the mobile station 8-72 uplink signals at the tower receive antennas of the base station 7-72. In the example described, the airborne jammer 2-M has detected the location of the base station 7-72 by sensing the BCCH signals from the base station 7-72. Additionally, the airborne jammer 2-M has targeted the jamming signals in the small target region 72 surrounding the base station 7-72. In this manner, the mobile station 8-72, typical of potentially many mobile stations 8, is prevented from communicating in the cell region 31-72. In the operation described, no jamming signals are sent to jam the downlink signals from the tower transmit antennas of the base station 7-72 that transmits to the mobile stations, such as typical mobile station 8-72. By not transmitting such downlink jamming signals, the power requirements for the jamming signals are reduced by one half. The power not used for downlink jamming signals can be used to double the available power for uplink jamming signals.

In FIG. 14, a JJ ground-based jammer 2-J is also operating in the region 72. The operations of the airborne jammer 2-M and the ground-based jammer 2-J, in one embodiment, are independent and each jammer ignores the other. In another embodiment, the operations are coordinated using a synchronized "look through" period during which communication between the jammer 2-M and the jammer 2-J occurs within the GSM band. Similarly, the other J1, . . . , J4 jammers 2-1, . . . , 2-4 operate independently or alternatively operate coordinated with the airborne jammer 2-M using a common synchronized "look through" period.

Figure 15:
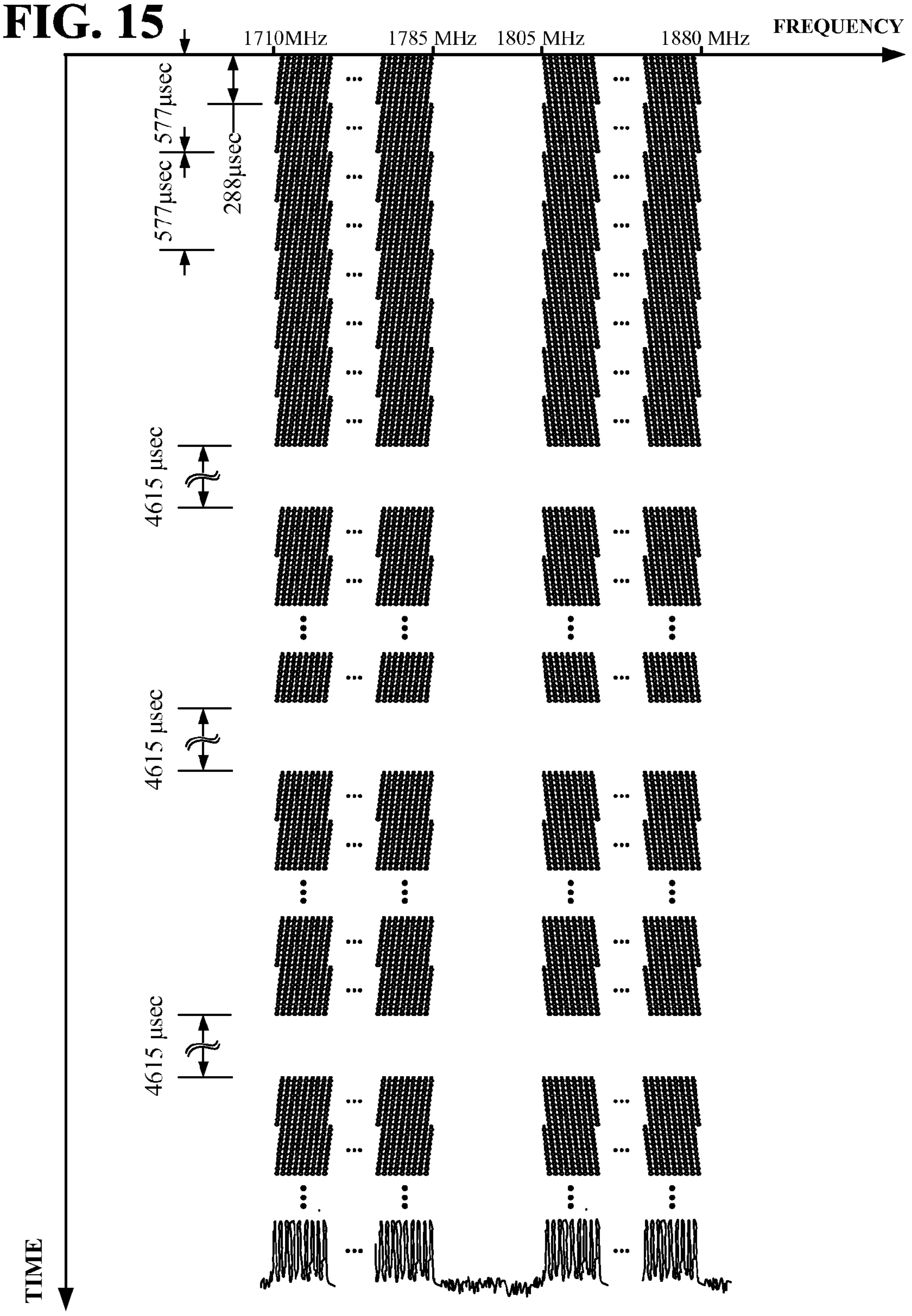
FIG. 15 depicts a representation of the tone comb jammer signals of FIG. 5 extended for the entire GSM 1800 MHz system and including "look through" periods.

In FIG. 15, a representation is shown of the tone comb jammer signals of FIG. 5 extended for the entire GSM 1800 MHz system and including "look through" periods. The active range for the GSM 1800 MHz frequency band is from 1710 MHz to 1785 MHz and from 1805 MHz to 1880 MHz. The tone signals of the type shown in FIG. 5 and FIG. 6 are provided over the active range. The bottom part of FIG. 15 is the last spectrum of the signal in the top part. Note that all of the power is in the active range from 1710 MHz to 1785 MHz and from 1805 MHz to 1880 MHz and no power is allocated for frequencies below 1710 MHz, in the range from 1785 MHz to 1805 MHz or above 1880 MHz. While FIG. 15 depicts jamming signals covering the entire 1800 MHz GSM communication frequency band, any subset of that band can be employed. The full band or a subset thereof is a selectable parameter of the tone comb jammer. In FIG. 15, the repetition of jamming signals in frequency occurs 76 times for the lower sideband from 1785 MHz to 1710 MHz and 76 times for the upper sideband from 1805 MHz to 1880 MHz. As shown in FIG. 5 and FIG. 6, each set that is repeated 76 times in frequency includes the 10 tones having a 0.1 μsec jamming signal frequency interval with each tone having a 28.8 μsec dwell time. The repetition of jamming signals repeats in time every 288 μsec, that is, twice per 577 μsec burst period. In FIG. 15, the "look through" period of 4615 μsec is repeated in time after sequences of burst periods with multi-tone jamming signals.

Similarly, the low GSM bands from 890 to 915 MHz (phone uplink) and 935 to 960 MHz (tower downlink) can be jammed with the same technique and "look through" timing. In some GSM systems the tower down link has been extended to cover 925 to 960 MHz.

Figure 16:
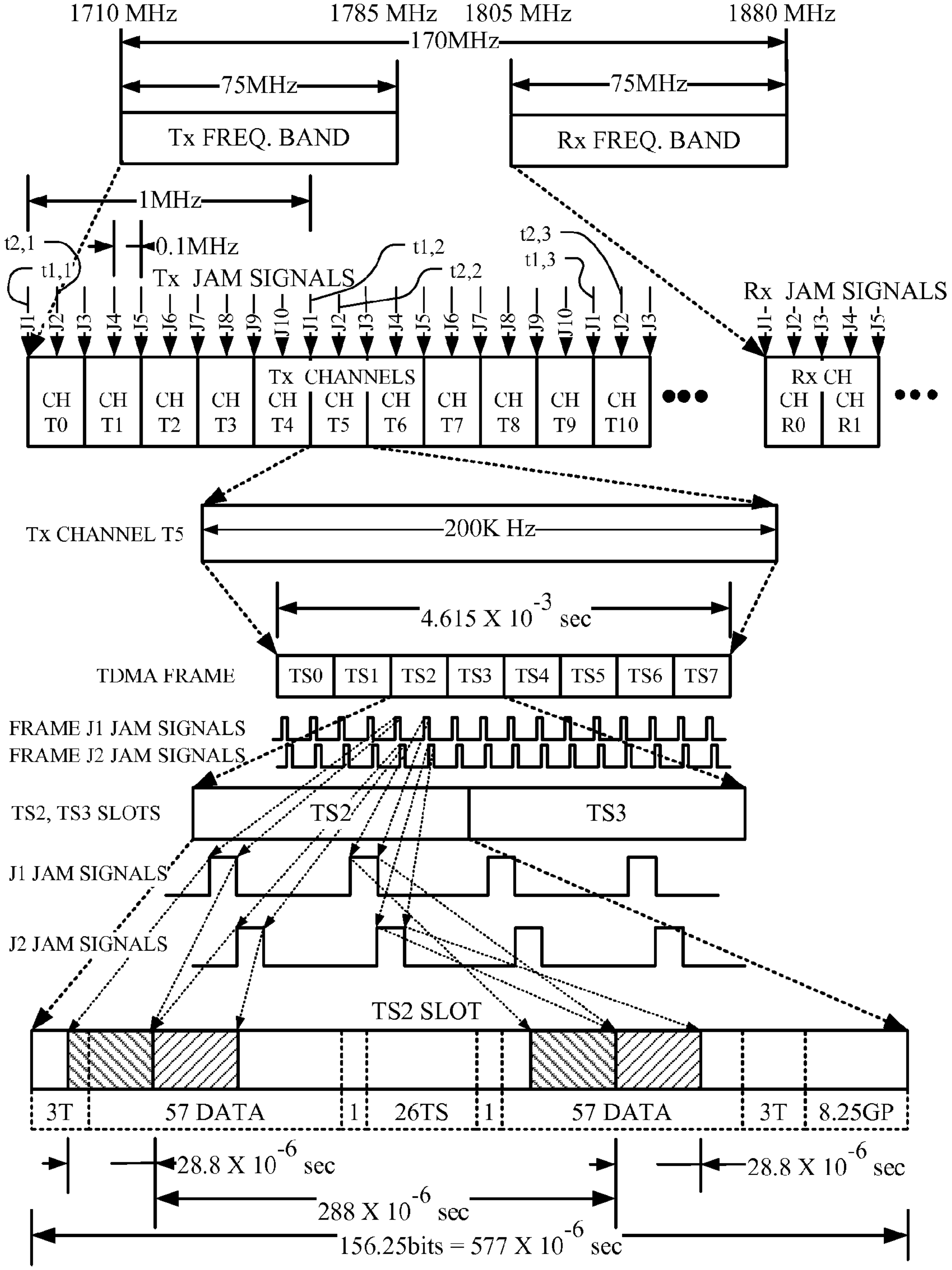
FIG. 16 depicts a representation of the signals and timing in a GSM 1800 MHz system in the presence of tone comb jamming signals.

In FIG. 16, an example of the operation of the tone comb jammer for the GSM 1800 MHz band system is shown. In the FIG. 16 example, detailed timing for a mobile station normal burst transmission together with the effects of the tone comb jammer signal on that burst. In FIG. 16, the 75 MHz transmission band is from 1710 MHz to 1785 MHz. Over this band, the 200 KHz channels are available some of which are shown as channels CH T0, CH T1, CH T2, . . . CH T10, . . . , and so forth. Similarly, the receive channels CH R0, CH R1, . . . , and so forth are shown.

As shown in connection with FIG. 5, FIG. 6 and FIG. 7, the tone comb signals have tones repeated every 1 MHz covering every 5$^{th}$ channel. In FIG. 16, the transmitter jam signals J1, J2, . . . , J10 are distributed over five channels and are then repeated over the next five channels. For example, for channels CH T0, CH T1, CH T2, . . . CH T4, the jammer signals are J1, J2, . . . , J10. The jammer signals J1, J2, . . . , J10 can be understood with reference to FIG. 6. In FIG. 6, the J1 jammer signal for CH T0 is the t1,1 tone and the J2 jammer signal for CH T0 is the t2,1 tone. After 288 μsec, the J1 jammer signal for CH T0 is the t11,0 tone and the J2 jammer signal for CH T0 is the t12,0 tone. In FIG. 6, the J1 jammer signal for CH T5 is the t1,2 tone and the J2 jammer signal for CH T5 is the t2,2 tone. After 288 μsec, the J1 jammer signal for CH T5 is the t11,1 tone and the J2 jammer signal for CH T0 is the t12,1 tone.

In FIG. 16, the effects of the jammer signals can be observed in connection with the TDMA frame for channel CH T5. The FRAME J1 JAM SIGNALS and the FRAME J2 JAM SIGNALS are shown below the TDMA frame for transmit channel CH T5. For purposes of explanation, the time slots TS2 and TS3 are expanded together with the expanded J1 JAM SIGNALS and the J2 JAM SIGNALS. The effects of the J1 JAM SIGNALS and the J2 JAM SIGNALS on the expanded TS2 time slot are shown at the bottom of FIG. 16. The TS2 time slot, the same as for all time slots, has 156.25 data bits. Each of the J1 JAM SIGNALS and J2 JAM SIGNALS jams about 8 of the bits in the TS2 time slot. Cumulatively, a total of about 32 bits are jammed, that is, about 20% of the 156.25 bits in a burst are jammed. By jamming only 20% of the bits in each burst, the jammer uses only about 20% of the power that would be required to jam all bits in a burst.

Figure 17:
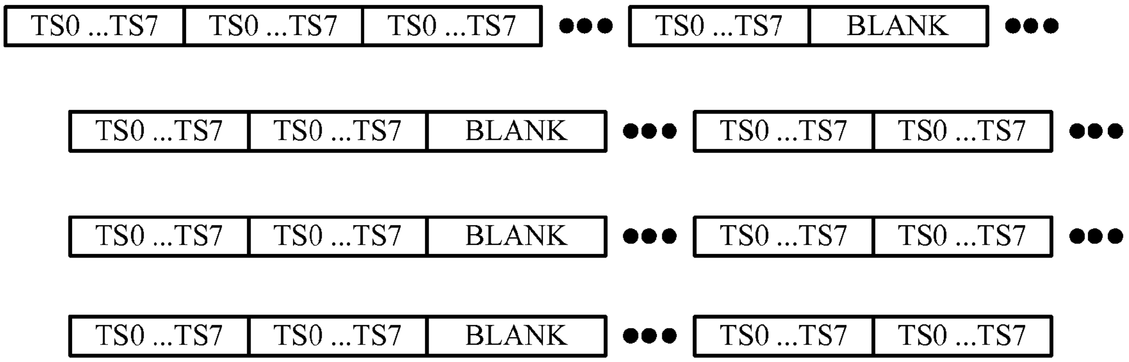
FIG. 17 depicts multiple ones of the TDMA frames of FIG. 16 with the "look through" periods of FIG. 15 indicated as "BLANK".
Figure 18:
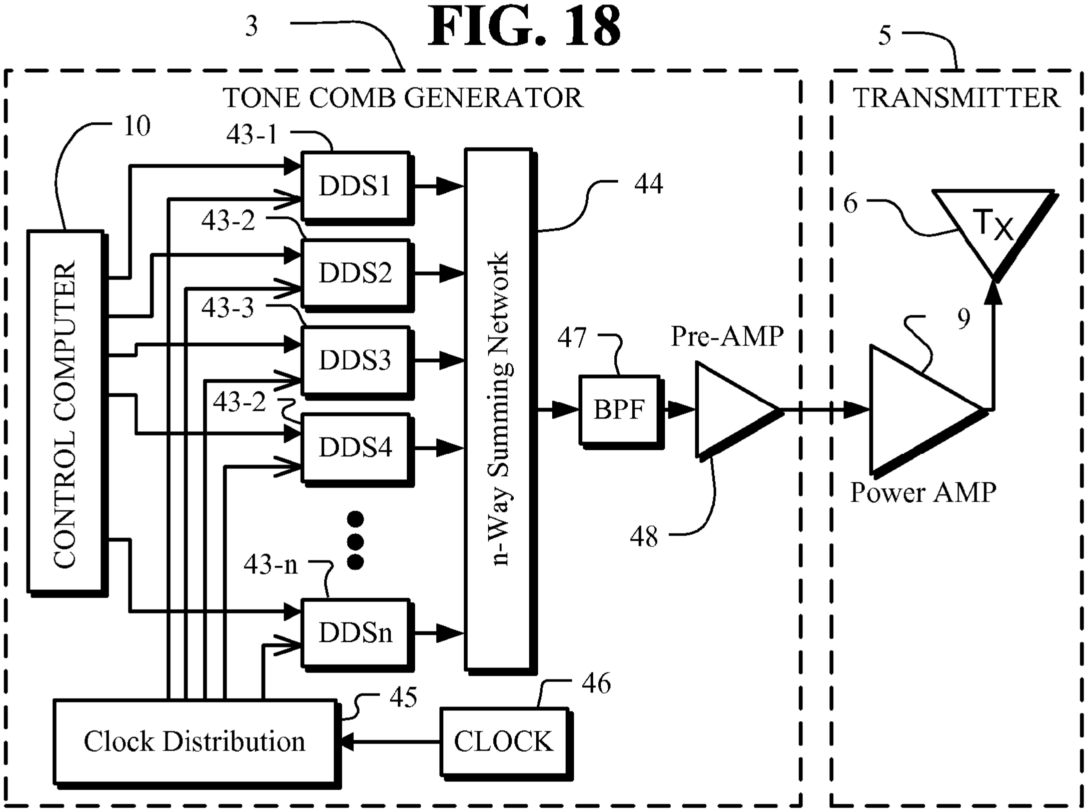
FIG. 18 depicts a schematic block diagram of another embodiment of the tone comb jammer of FIG. 1 using Direct Digital Synthesis.

In FIG. 17, multiple ones of the 4615 μsec TDMA frames of FIG. 16 are shown with the "look through" periods of FIG. 15 indicated as "BLANK". Each BLANK TDMA frame is similarly 4615 μsec.

Many jammer systems shut down jamming signal transmission for short "look through" periods of time as shown in FIG. 15 and FIG. 17 to observe the signal environment. This suspension of jamming operation allows a system to determine the presence and frequency of signals in the region. In an airborne embodiment as described in connection with FIG. 14, the "look through" period is employed, for example to enable the aircraft 70 to ascertain the location of base stations 7 and then to appropriately focus the jamming signals in selected regions in the target area 41 of FIG. 14. The "look through" period may also be used other communication systems, for example, to permit authorized communications to be permitted in the GSM frequency band.

While the tone comb jammer of the present invention does not require any "look through" period or sampling of the signal environment, the tone comb jammer may be deployed in a region together with jammers that do use "look through" jamming operation. In such a case, the jammer signal transmission of the tone comb jammer is coordinated by control 10 in FIG. 2 to be halted in accordance with the "look through" requirements of other jammer systems.

One way to halt transmission for "look through" periods is to store the signals in unit 11 of FIG. 2 with dead periods synchronized with the desired "look through" periods. The amplitudes of the tone comb signals for the "look through" period are set to zero. Another method of providing a "look through" period is to provide an ON/OFF switch in the signal path. Such a switch (not shown) is installed in the output from the tone comb generator 3, the output from the up-converter 4 or the output from the power amplifier 9. Still another method is to shut off the sample clock 13 during the desired "look through" dead periods.

FIG. 15 depicts a schematic block diagram of another embodiment of the tone comb jammer of FIG. 1. The tone comb jammer uses Direct Digital Synthesis (DDS) with a number of DDS integrate circuits 43-1, 43-2, 43-3, . . . , 43-n. Each of the integrated circuits in a conventional design generates one continuous wave signal directly at the RF transmit frequency without need for local oscillators and mixers. Each DDS circuit produces one of the 152 tones of the jamming signal at the RF frequency. The outputs of all 152 DDS circuits 43-1, 43-2, 43-3, . . . , 43-n are summed together in summing network 44 to form a composite output signal input to the bandpass filter 47. Control 10 controls the DDS circuits to change frequency every 28.8 msec by 0.1 MHz to produce the signal of the type shown in FIG. 5, FIG. 6 and FIG. 7.

While the DDS embodiment eliminates the need for the binary file generator 18 and the up-converter 4 of FIG. 2, a significant number of DDS chips are required which consume a significant amount of power. Also, substantial signal attenuation occurs in the hardware needed to sum the DDS signals and therefore amplifiers including a pre-amplifier 48 is used to bring the composite signal to the strength needed to feed the power amplifier 9.

Another drawback to the DDS embodiment is the limited flexibility provided by a limited number of DDS chips. In the case of the 1800 MHz GSM band, the transmit and the receive bands are 75 MHz each thus requiring 152 tones separated by 1 MHz to cover the entire GSM transmit and receive bands. A single signal DDS circuit per tone implementation requires 152 DDS integrated circuits. To cover both the 900 and 1800 MHz bands, the system requires 204 DDS integrated circuits if a separate integrated circuit is used for each jamming signal. The cost of the DDS integrated circuits, summing network and the amplifiers makes this DDS architecture expensive. Of course, special-purpose DDS integrated circuits may be used where multiple tones are generated from each DDS integrated circuit. With such special-purpose DDS integrated circuits, the number of DDS integrated circuits required for a one comb generator is greatly reduced. In one embodiment, the DDS integrated circuit method uses a phase accumulator, driven by a specified driving frequency, which accumulates phase increments. The phase is incremented each clock pulse of the driving frequency where the size of the phase increment determines the actual output frequency. The binary width of the phase accumulator (accumulator overflows) determines the minimum frequency, which is equal to the frequency step, achievable by the DDS. Of course, multiple phase accumulations can be used in a common integrated circuit in order to generate multiple tones from a single integrated circuit. With such implementations, the cost of DDS circuits is greatly reduced.

Figure 19:
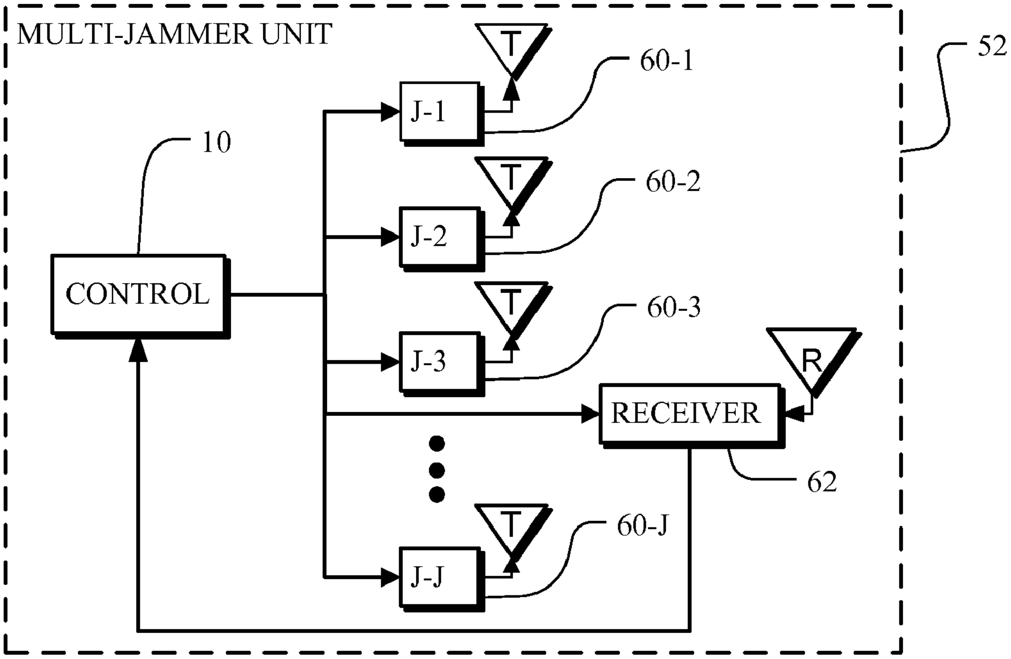
FIG. 19 depicts a multiple jammer system including one or more tone comb jammers.

In FIG. 19, multiple jammers 60 including the jammers 60-1, 60-2, 60-3, . . . , 60-J, The jammers 60 typically include, for example, one or more of noise barrage jammers, targeted continuous wave jammers, chirp jammers and tone comb jammers. The jammers 60 typically have a different band for jamming, for example, the GSM 900 band or the GSM 1800 band, or typically operate with different jamming methods. The targeted continuous wave (CW) jammers target specific CW signals present in the operating environment. The specific CW signals are often determined during a receive time of "look through" operation. The noise barrage jammers operate to blanket a communications frequency band with noise. A regenerative jammer is described, for example, in the above-identified application entitled REGENERATIVE JAMMER WITH MULTIPLE JAMMING ALGORITHMS. Such a jammer periodically stops jamming transmissions in order to be able to receive local communications signals present in the local environment. Once local communications signals have been received, the jammer regenerates the those received signals for transmission as jamming signals. The receiving operation during the "look through" period is performed when some or all of the jammers 60 have been temporarily stopped from transmitting jamming signals.

In FIG. 19, the control 10 coordinates the "look through" timing for all of the jammers 60. Also, the control 10 functions to select which ones of the jammers 60 are to be active and the parameters to be used.

While in FIG. 19, each of the jammers 60 is shown as including a transmit antenna, one or more common antennas can be shared among one or more of the jammers 60. Similarly, amplifiers, clocks and other components can be shared among the jammers 60.

In FIG. 19, the receiver 61, including a receiving antenna R, is used when none of the jammers 60 provides satisfactory receivers for detecting the signal environment surrounding the multi jammer unit 52. Such a receiver is described in the in the above-identified application entitled REGENERATIVE JAMMER WITH MULTIPLE JAMMING ALGORITHMS.

In FIG. 19, the jammers 60, including jammers 60-1, 60-2, . . . , 60-J, are used in combination to jam multiple different signals and bands in order to provide composite jamming that concurrently jams many different signals in a broadband signal environment. The different jammers may not be co-located, but operate in the same geographic vicinity. A control unit 10 in each jammer system will control the timing with a common clock source, such as GPS, to allow the systems to work together.

Figure 20:
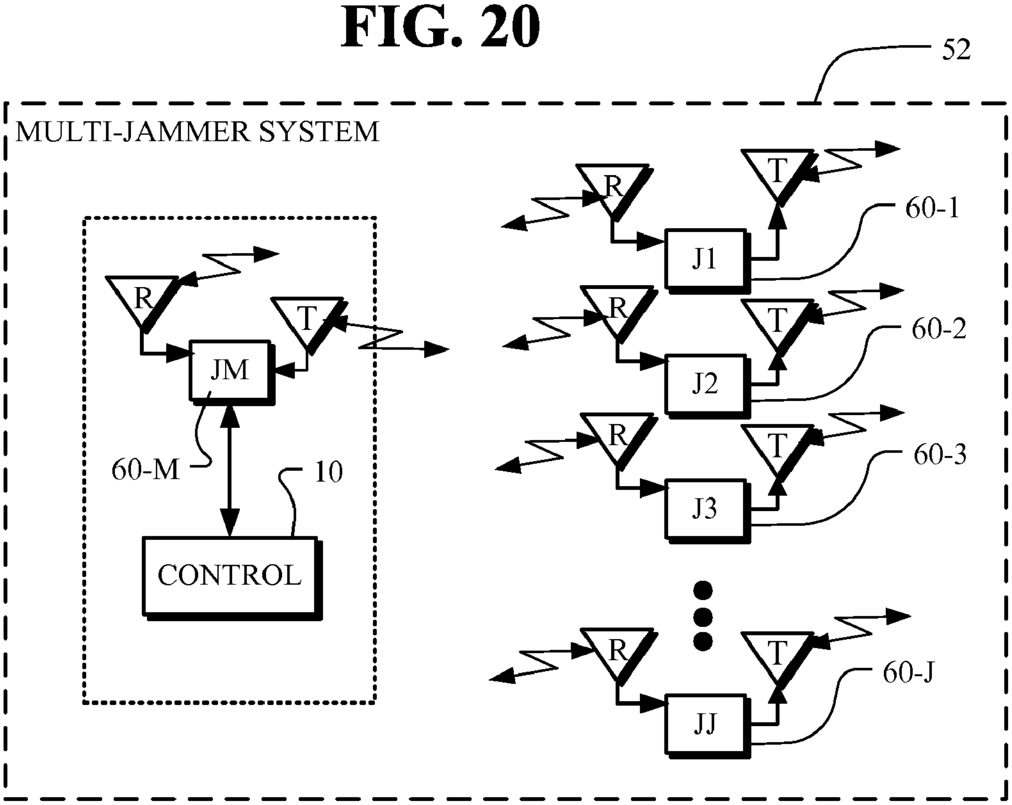
FIG. 20 depicts a multiple jammer system including one or more tone comb jammers including a master tone comb jammer as airborne.

In FIG. 20, a multiple jammer system is shown including J1, . . . , JJ tone comb jammers 60-1, 60-2, . . . , 60-J including a JM master tone comb jammer 60-M. Each of the J1, . . . , JJ tone comb jammers includes a transmitter T for transmitting the jamming signals and includes a receiver R for receiving control and timing signals including GPS (Global Positioning Signals). The JM master tone comb jammer 60-M under operation of the control 10 transmits control signals to the receivers R of the J1, . . . , JJ tone comb jammers. In one example, the control signal from the JM master tone comb jammer 60-M specifies the time of the "look through" period relative to the a GPS clock signal. In this manner, all of the jammers have the same "look through" period and do not interfere with the operations of the other jammers.

Figure 21:
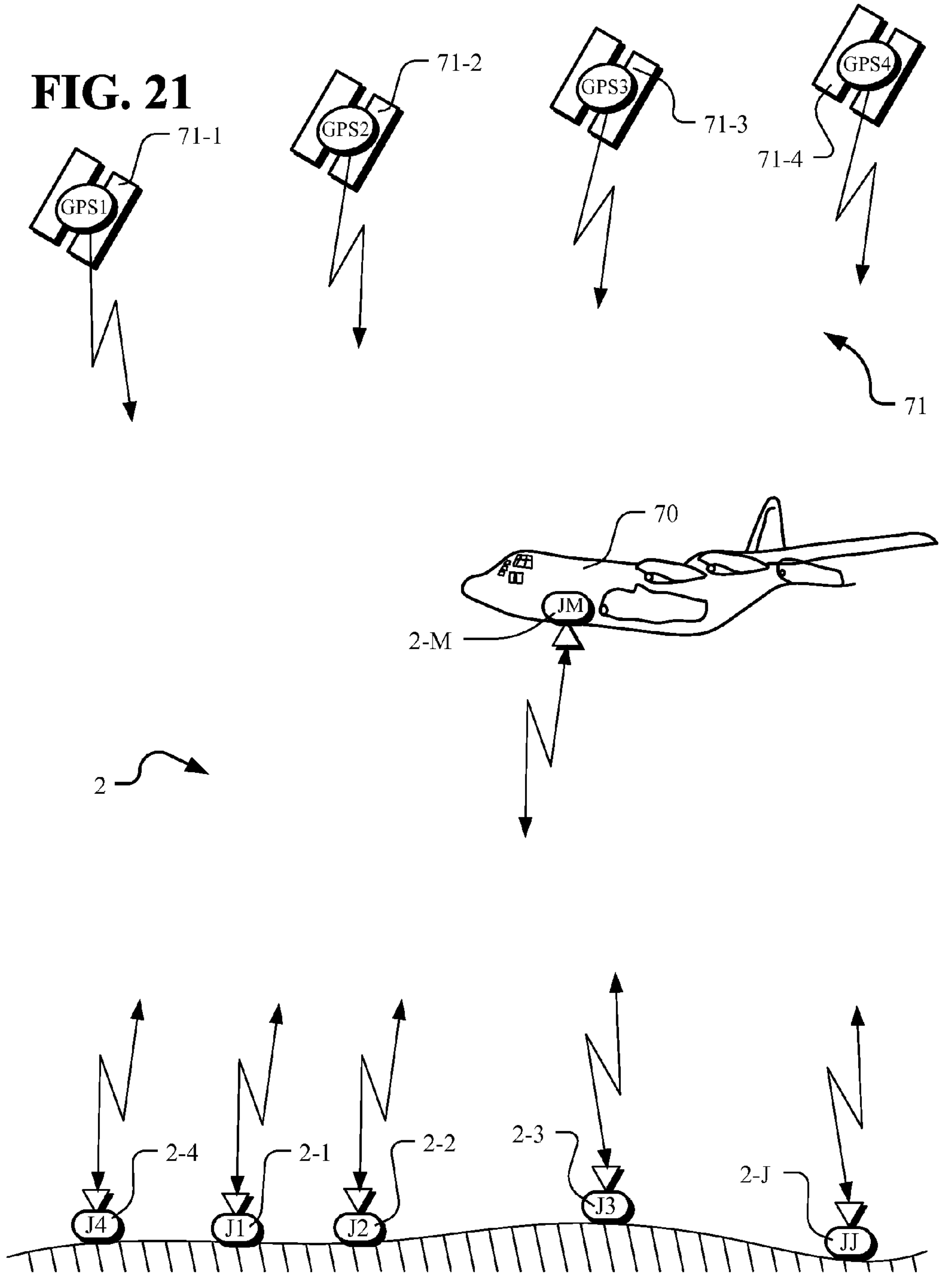
FIG. 21 depicts an environment including GPS (Global Positioning System) satellites, an airborne jammer and a plurality of ground jammers.

In FIG. 21, the environment includes GPS (Global Positioning System) satellites 71-1, 71-2, 71-3 and 71-4. An airborne JM jammer 2-M in located in the aircraft 70. The aircraft 70 includes an ECM system. The J1, . . . , JJ tone comb jammers 2-1, 2-2, . . . , 2-J include transceivers (including a transmitter T for transmitting the jamming signals and including a receiver R for receiving control and timing signals including GPS signals).

The satellites 71, including satellites 71-1, 71-2, 71-3 and 71-4, are part of the GPS space-based global navigation satellite system. The GPS system provides reliable positioning, navigation, and timing services anywhere on or near the Earth which has an unobstructed view of four or more GPS satellites. The GPS system includes the secure GPS Precise Positioning Service used by the military and others and includes the Standard Positioning Service used by the general public. The GPS satellites 71 broadcast signals from space that GPS receivers use to provide three-dimensional location (latitude, longitude, and altitude) plus precise time. The GPS system operates with frequencies that are outside the frequency bands jammed by the J1, . . . , JJ and JM jammers.

The J1, . . . , JJ and JM jammers 2 of FIG. 21 form the multi jammer system of FIG. 20. When the jammers 2 operate in an unsynchronized mode, the operation of one jammer may defeat the ability of other jammers from having reliable "look through" operations. While such unsynchronized operation is acceptable for each of the J1, . . . , JJ and JM jammers 2 alone, other ECM systems may require reliable "look through"

operations. In order to provide effective "look through" operations, the J1, . . . , JJ and JM jammers 2 are synchronized so that all "look through" periods occur at the same time.

The operation for synchronizing "look through" periods for the J1, . . . , JJ and JM jammers 2 is achieved in a number of ways. In general, synchronization signals are communicated from the transmitter of the JM jammer 60-M to the receivers of the J1, . . . , JJ jammers 60-1, . . . , 60-J. The synchronization signals specify an offset time from a GPS reference time when the "look through" period is to occur. In response to receiving the synchronization signals, each of the J1, . . . , JJ jammers 60-1, . . . , 60-J conforms its transmissions such that the BLANK periods, as described in connection with FIG. 15 and FIG. 17, all occur at the same time. In this manner, all of the J1, . . . , JJ and JM jammers 2 are in non-jamming operation during the common synchronized "look through" period.

In one embodiment, the synchronization signals are transmitted in secure out-of-band communication channels outside the frequency bands being jammed by the J1, . . . , JJ and JM jammers 2 and hence the jamming operations of the jammers 2 do not affect synchronization operations.

In another embodiment, the synchronization signals are transmitted in secure inland communication channels within the frequency bands being jammed by the J1, . . . , JJ and JM jammers 2 and hence the jamming operations of the jammers 2 can affect synchronization operations. In order to use in-band synchronization, each of the jammers J1, . . . , JJ transmits a unique jammer identification signal during its "look through" period. Before synchronization, the "look through" periods for the jammers J1, . . . , JJ will, in general, be randomly distributed in time.

When a newly arriving aircraft 70 arrives with a master JM jammer 2-M, the jammer 2-M surveys the regions of interest looking for jammer identification signals from all jammers J1, . . . , JJ before initiating jamming signals from the master JM jammer 2-M. Upon detection of any one of the jammers J1, . . . , JJ, the master JM jammer 2-M registers the one of the jammers J1, . . . , JJ, and sends a synchronization signal to synchronize the "look through" period for the registered jammer. The registration is repeated for all of the jammers J1, . . . , JJ and all of the detected ones of the jammers J1, . . . , JJ are synchronized to the common "look through" period. After the registration period, the master JM jammer 2-M commences jamming operations and operates with a common "look through" period with all registered ones of the jammers J1, . . . , JJ.

When a master JM jammer 2-M is operating in a region with unregistered ones of the jammers J1, . . . , JJ having non-synchronized "look through" periods, each of unregistered jammers detects the jamming condition during its "look through" period. Each of the jammers J1, . . . , JJ, unless registered with the master JM jammer 2-M, is controlled to look during its "look through" period for a jammed condition. The registration condition for each registered jammer is retransmitted periodically, for example during each common "look through" period, to each registered jammer. Upon detecting the jammed condition, each one of the jammers J1, . . . , JJ detecting such a condition sends out an identification signal for one of every one of the burst periods TS0 . . . TS7 and listens for a synchronization response. With such transmission, an unregistered jammer will eventually transmit during the common "look through" period and be detected by the master JM jammer 2-M. Upon receiving the synchronization response, the jammer sets its "look through" period to the synchronized common "look through" period and becomes one of the registered jammers.

In connection with the FIG. 20 and FIG. 21 multi jammer systems, it was assumed that the master jammer 2-M was an airborne jammer. While such assumption is often the preferred embodiment, any of the jammers J1, . . . , JJ can be the master jammer. Accordingly, in FIG. 20, the JM jammer 60-M need not be airborne. Similarly, any one or more of the jammers J1, . . . , JJ may be airborne.

In another embodiment, synchronization to a common "look through" period can be implemented if all jammers in a region have a pre-agreed upon "look through" period. Such a pre-agreed upon "look through" period can be established, for example, relative to the GPS 1 pulse per second (PPS) timing signal.

In the embodiments of FIG. 14 and FIG. 21, only a single aircraft 70 was shown as typical. However, more than one aircraft are possible with one or more airborne jammers like the airborne JM jammer 2-M described. Further, the control functions of control 10 for controlling synchronized "look through" periods can be part of or separate from any one of the jammers J1, . . . , JJ and JM. In one example, one or more unmanned remotely controlled aircraft include jammers under the control of a master controller which is airborne or ground based.

While the invention has been particularly shown and described with reference to preferred embodiments thereof it will be understood by those skilled in the art that various changes in form and details may be made therein without departing from the scope of the invention.

The invention claimed is:

1. A jammer for transport by an aircraft for jamming communications in a communications system where the communications system operates with digital bursts having burst periods measured in time and occurring in a communication frequency band having a transmit band and a receive band, said jammer comprising:

an airborne tone comb generator for providing repetitions of jamming signals for the communication frequency band, said jamming signals having jamming signal frequency intervals providing frequency separation between jamming signals, said jamming signals generated with dwell times less than a burst period, an airborne transmitter for transmitting said jamming signals as RF signals.

2. The jammer of claim 1 wherein the dwell time is approximately twenty percent or greater than the burst period.

3. The jammer of claim 1 wherein the communication band includes the entire active portion of a GSM band.

4. The jammer of claim 1 wherein the communication band includes a GSM band for base station transmitted channels.

5. The jammer of claim 1 wherein the communication band includes a GSM band for mobile station transmitted channels.

6. The jammer of claim 1 wherein the communication band includes a GSM band for base station transmitted channels and includes a GSM band for mobile station transmitted channels.

7. The jammer of claim 1 wherein the communication band corresponds to a subset of a GSM band for base station transmitted channels and corresponds to a subset of a GSM band for mobile station transmitted channels.

8. The jammer of claim 1 wherein the communication band has a plurality of channels and wherein the jamming signals dwell on each channel for a dwell period of time.

9. The jammer of claim 8 wherein communication in each channel is with TDMA bursts and wherein the jamming signals dwell on each channel at least once for each TDMA burst.

10. The jammer of claim 9 wherein the dwell period is approximately 28.8 μsec for each jamming signal.

11. The jammer of claim 1 wherein the jamming signals are provided in a set and wherein the set is repeated in frequency.

12. The jammer of claim 11 wherein the set is continuously repeated every 1.0 MHz.

13. The jammer of claim 1 wherein the jamming signal frequency interval is 0.1 MHz.

14. The jammer of claim 1 wherein the jamming signals are composite signals formed of continuous wave signals having random relative phases.

15. The jammer of claim 1 wherein said tone comb generator includes, a binary file generator including a digital store unit having a random access memory for storing said jamming signals and for providing said jammer signals as baseband signals with said jamming signal frequency intervals, an up-converter for converting said baseband signals to RF jammer signals.

16. The jammer of claim 15 wherein said up-converter includes a local oscillator providing an RF local oscillator signal, a mixer for multiplying the RF local oscillator signal and the baseband signals to provide lower sideband signals and upper sideband signals as said RF jammer signals.

17. The jammer of claim 16 wherein said lower sideband signals correspond to the transmit band and said upper sideband signals correspond to the receive band.

18. The jammer of claim 1 including a control unit for controlling operating parameters and wherein said operating parameters include a "look through" period when jamming signals are not transmitted.

19. The jammer of claim 1 wherein said tone comb generator generates said jamming signals using direct digital synthesis.

* * * * *